United States Patent
Lipscomb

(10) Patent No.: US 11,602,120 B2
(45) Date of Patent: Mar. 14, 2023

(54) LIGHTWEIGHT COATED EXTRUDED GRANULAR ABSORBENT

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 14/656,086

(22) Filed: Mar. 12, 2015

(65) Prior Publication Data

US 2015/0181832 A1 Jul. 2, 2015

Related U.S. Application Data

(63) Continuation-in-part of application No. 13/868,073, filed on Apr. 22, 2013, now Pat. No. 9,266,089, and
(Continued)

(51) Int. Cl.
*A01K 1/015* (2006.01)

(52) U.S. Cl.
CPC .......... *A01K 1/0154* (2013.01); *A01K 1/0152* (2013.01); *A01K 1/0155* (2013.01)

(58) Field of Classification Search
CPC ................ A01K 1/0154; A01K 1/0155; A01K 1/0152
(Continued)

(56) References Cited

U.S. PATENT DOCUMENTS

| 3,316,590 A | 5/1967 | Rettig |
| 3,672,945 A | 6/1972 | Taylor |

(Continued)

FOREIGN PATENT DOCUMENTS

| DE | 3841289 A1 | 7/1990 |
| DE | 4424946 | 1/1996 |

(Continued)

OTHER PUBLICATIONS

DE19509747, Paul Wueseke Kalksandsteinwerk, "Highly porous granulate used as animal litter" Machine Translation, Sep. 19, 1996.*
ISR & Written Opinion dated May 24, 2016 in PCT/US2016/015000.
Stryapkov et al. "Ekstruzionnaya obrabotka kak faktor polucheniya "ekologicheski bezopasnykh produktov iz zerna i ego proizvodnykh. Vestnik OGU 2'2004, pp. 171-174.
(Continued)

*Primary Examiner* — Colin W. Slifka
(74) *Attorney, Agent, or Firm* — Boyle Fredrickson S.C.

(57) ABSTRACT

Method and coated lightweight granular absorbent formed of lightweight inner cores made of extruded pellets coated with powdered smectite, preferably bentonite, to form an outer sorbent smectite shell around each pellet producing lightweight sorbent granules where the pellets have sufficient water soluble binder to facilitate shell formation and clumping during sorbent use. When lightweight sorbent granules are wetted, clumps are formed that shrink during drying producing a clean, generally non-sticking clump having a high clump retention rate of at least 92% and/or a crush strength of at least 15 PSI. In a preferred method, the pellets are dried coated with dry powdered smectite before wetting using an atomizer or mister while turbulently directing air towards the pellets and powdered smectite to coat the pellets with the powdered smectite forming the outer sorbent shell while minimizing pellet shrinkage and densification. Such lightweight granular sorbent is well suited for use as litter.

24 Claims, 8 Drawing Sheets

Related U.S. Application Data a continuation-in-part of application No. 13/868,084, filed on Apr. 22, 2013, now Pat. No. 9,266,090, and a continuation-in-part of application No. 13/842,534, filed on Mar. 15, 2013, now Pat. No. 9,266,088.

(60) Provisional application No. 61/952,133, filed on Mar. 12, 2014, provisional application No. 61/931,609, filed on Jan. 25, 2014, provisional application No. 61/775,707, filed on Mar. 11, 2013, provisional application No. 61/699,858, filed on Sep. 11, 2012.

(58) Field of Classification Search
USPC .......................................... 119/173; 427/212
See application file for complete search history.

(56) References Cited

U.S. PATENT DOCUMENTS

| | | | | |
|---|---|---|---|---|
| 4,821,677 | A | * | 4/1989 | Harrison ............ A01K 1/0154 119/171 |
| 4,822,546 | A | | 4/1989 | Lohkamp |
| 5,452,684 | A | * | 9/1995 | Elazier-Davis ...... A01K 1/0154 119/173 |
| 5,638,770 | A | | 6/1997 | Peleties |
| 5,735,232 | A | | 4/1998 | Lang et al. |
| 5,763,083 | A | | 6/1998 | Berrigan |
| 5,806,462 | A | | 9/1998 | Parr |
| 5,942,170 | A | | 8/1999 | Peitz |
| 5,975,019 | A | * | 11/1999 | Goss .................... A01K 1/0154 119/173 |
| 6,148,768 | A | | 11/2000 | Ochi et al. |
| 6,220,206 | B1 | | 4/2001 | Sotillo et al. |
| 6,720,406 | B1 | | 4/2004 | Eisner et al. |
| 7,964,529 | B2 | * | 6/2011 | Borgese ............... A01K 1/0152 23/313 R |
| 2003/0065296 | A1 | | 4/2003 | Kaiser et al. |
| 2004/0112298 | A1 | | 6/2004 | Buttersnack et al. |
| 2004/0244710 | A1 | | 12/2004 | Tsengas et al. |
| 2005/0005869 | A1 | | 1/2005 | Fritter et al. |
| 2007/0017453 | A1 | | 1/2007 | Fritter et al. |
| 2007/0175403 | A1 | | 8/2007 | Wang et al. |
| 2007/0289543 | A1 | | 12/2007 | Petska et al. |
| 2008/0223302 | A1 | | 9/2008 | Wang et al. |
| 2009/0000562 | A1 | | 1/2009 | Jenkins et al. |
| 2009/0017166 | A1 | | 1/2009 | Wijnoogst et al. |
| 2010/0269758 | A1 | | 10/2010 | Fuchshuber |
| 2011/0185977 | A1 | * | 8/2011 | Dixon .................... A01K 29/00 119/173 |
| 2011/0253055 | A1 | | 10/2011 | Tang et al. |
| 2011/0287123 | A1 | | 11/2011 | Feichtinger et al. |
| 2012/0152115 | A1 | | 6/2012 | Gerds et al. |
| 2013/0213313 | A1 | | 8/2013 | Wang et al. |
| 2013/0213314 | A1 | | 8/2013 | Wang et al. |

FOREIGN PATENT DOCUMENTS

| | | | |
|---|---|---|---|
| DE | 19509747 A1 | * 9/1996 | ........... A01K 1/0154 |
| FR | 2794993 | 12/2000 | |
| JP | H03290126 | 12/1991 | |
| JP | 2000051691 | 2/2000 | |
| JP | 2007039954 | 2/2007 | |
| JP | 2009195765 | 9/2009 | |
| RU | 2153251 | 7/2000 | |
| RU | 2273129 | 4/2006 | |
| WO | 1984003513 | 9/1984 | |
| WO | 2011094022 | 8/2011 | |
| WO | 2011134074 | 11/2011 | |
| WO | 2014043284 | 3/2014 | |

OTHER PUBLICATIONS

Written Opinion dated Mar. 24, 2016 issued in PCT/US2015/062233.
ISR and Written Opinion dated Dec. 30, 2013 issued in PCT/US2013/059284.
ISR and Written Opinion dated Dec. 19, 2013 issued in PCT/US2013/059325.
ISR and Written Opinion dated Jun. 4, 2015 issued in PCT/US2015/012869.
International Preliminary Report on Patentability dated Apr. 22, 2016 issued in PCT/US2015/012969.
ISR and Written Opinion dated May 4, 2015 issued in PCT/US2015/012969.
Extended EP Search Report dated Apr. 22, 2016 issued in EP App. No. 13837242.0.
Extended EP Search Report dated Jun. 3, 2016 issued in EP App. No. 13837783.3.
ISR and Written Opinion dated Jun. 18, 2015 issued in PCT/US2015/020167.
ISR and Written Opinion dated Aug. 6, 2015 issued in PCT/US2015/020310.
Patent Examination Report No. 1 dated May 4, 2016 issued in AU 2013315516.
Supplemental EP Search Report dated Nov. 24, 2017 in corresponding EP App. No. 15 76 1403.

* cited by examiner

LIGHTWEIGHT COATED EXTRUDED GRANULAR ABSORBENT

CROSS REFERENCE

This application claims priority in U.S. Provisional Patent Application Nos. 61/931,609 filed Jan. 25, 2014 and 61/952,133 filed Mar. 12, 2014 under 35 U.S.C. § 119(e), and is a continuation-in-part of each of U.S. patent application Ser. No. 13/868,084 filed Apr. 22, 2013, U.S. patent application Ser. No. 13/868,073 filed Apr. 22, 2013, and U.S. patent application Ser. No. 13/842,534 filed Mar. 15, 2013, each of which claims priority in U.S. Provisional Patent Application No. 61/775,707 filed Mar. 11, 2013 and in U.S. Provisional Patent Application No. 61/699,858 filed Sep. 11, 2012 under 35 U.S.C. § 119(e), the entire disclosures of each of which is hereby expressly incorporated herein by reference.

FIELD

The present invention is directed to coated extruded granular absorbent, a method of making coating granular absorbent, and more particularly to a lightweight coated extruded granular absorbent and method of making lightweight coated extruded granular absorbent.

BACKGROUND

Absorbents are widely used by consumers and companies alike for many different types of absorbent applications. Absorbents are used to pick up many different types of materials, including liquids, chemicals, particulate matter, and other materials, for removal. Significant markets for absorbents include oil absorbent and litter.

Unfortunately, many types of absorbents are made from relatively dense granular absorbent materials making them costly to ship, heavy to transport, and require considerable effort to pick up when spent or used. Conventional clay-based cat or animal litters typically have a density greater than 40 pounds per cubic feet, making them not only relatively costly to ship but relatively challenging to carry because litter containers tend to be rather heavy.

Conventional clay-based litter is typically made of granules of smectite, typically smectite or swelling clay(s), like bentonite clay(s), which frequently includes other components like calcium carbonate, silica, fragrances or scents, and odor controllers. While many attempts have been made in the past to produce lighter weight clay-based litters having bulk densities less than 40 pounds per cubic feet, these attempts have had limited success. Quite often litter performance has been adversely affected or the weight reduction not all that significant.

While many attempts to produce lighter weight clay-based litter by adding lighter weight components are limited by the fact that such litters still require at least 70% swelling clays, typically bentonite, to still perform adequately as litter. This typically is because the lighter weight components added to reduce weight and bulk density are nothing more than fillers as they typically are not absorbent nor facilitate clumping. Because such litter still requires so much bentonite to adequately perform as a result, there is a limit to how much its weight and bulk density can be reduced.

What is needed is a light-weight clay-based granular absorbent well suited for cat litter whose reduction in weight and bulk density does not come at the expense of performance.

SUMMARY

The present invention is directed to a lightweight granular sorbent made of lightweight sorbent granules each having a lightweight core with an outer sorbent shell surrounding the core. The present invention also is directed to a method of making lightweight granular sorbent of the present invention having lightweight sorbent granules each with a lightweight core around which an outer sorbent shell is formed by applying particles of sorbent shell material to the core that preferably is composed of a powdered smectite. The present invention also is directed to a method of making lightweight sorbent granules where the lightweight cores are formed of pellets extruded from a starch containing material each having a water-soluble binder that preferably is a cold water soluble binder formed by modification of starches during pellet extrusion providing sufficient water soluble binder to not only facilitate coating each pellet with powered smectite to form the outer shell of each lightweight sorbent granule but which also facilitates clumping when finished lightweight sorbent granules are wetted during sorbent use. Such lightweight sorbent granules form coated extruded granular absorbent well suited for use as scoopable clumping litter.

The present invention also is directed to a method of coating lightweight cores preferably formed of starch-containing pellets coated with particles of sorbent shell material, preferably powdered smectite, such as powdered bentonite, using a dry coating step where dry powdered smectite is applied onto dried pellets prior to wetting using an atomizer or mister together with turbulently flowing gas, e.g. air, to wet the smectite powder before wetting the pellets so wetted smectite powder bonds to the pellets minimizing the amount of water-soluble binder that solubilizes during coating. Minimizing the amount of water-soluble binder in each pellet that solubilizes during coating advantageously reduces extruded pellet shrinkage and densification enabling the extruded pellets to be coated with the powdered smectite and form lightweight sorbent granules in accordance with the present invention having a size preferably within ±15% and preferably within ±10% of original pellet size. In a preferred embodiment, lightweight sorbent granules made using such a preferred coating method of the present invention coats each extruded pellet with powdered smectite producing lightweight sorbent granules each having a size no greater than original uncoated extruded pellet size. Such a method of coating extruded granular absorbent produces extruded coated granular absorbent of the present invention is particularly well suited for use as lightweight cat litter having lightweight sorbent litter granules each with an outer bentonite shell.

Coated granular absorbent formed of such lightweight sorbent granules of the present invention are formed of lightweight sorbent cores each coated with powdered smectite material that preferably is powdered sodium bentonite producing lightweight sorbent granules having a bulk density at least 40% less than that of conventional pet or animal litter formed of solid bentonite litter granules. Coated granular absorbent formed of such lightweight litter granules has a water absorption capacity of between three and five times litter granule weight as the lightweight sorbent inner cores responsible for lowering density and weight advantageously absorb water well. Where the lightweight sorbent inner cores are formed of pellets extruded from starch-containing material producing pellets having at least 7.5% cold water soluble binder by pellet weight, the water-soluble binder advantageously facilitates bonding of powdered smectite material to the pellets during coating and facilitates clumping when finished lightweight sorbent granules are wetted during sorbent use.

Coated granular absorbent formed of lightweight sorbent granules of the present invention are particularly well suited for use as litter as the lightweight sorbent granules readily absorb liquids, including water and urine, rapidly clump forming clumps that shrink as they dry producing clean nonstick clumps having a desirably high clump retention rate of at least 95% and/or a strong clump crush strength of at least 15 pounds per square inch.

These and other objects, features and advantages of this invention will become apparent from the following detailed description of the invention and accompanying drawings.

DRAWING DESCRIPTION

Figure 5:
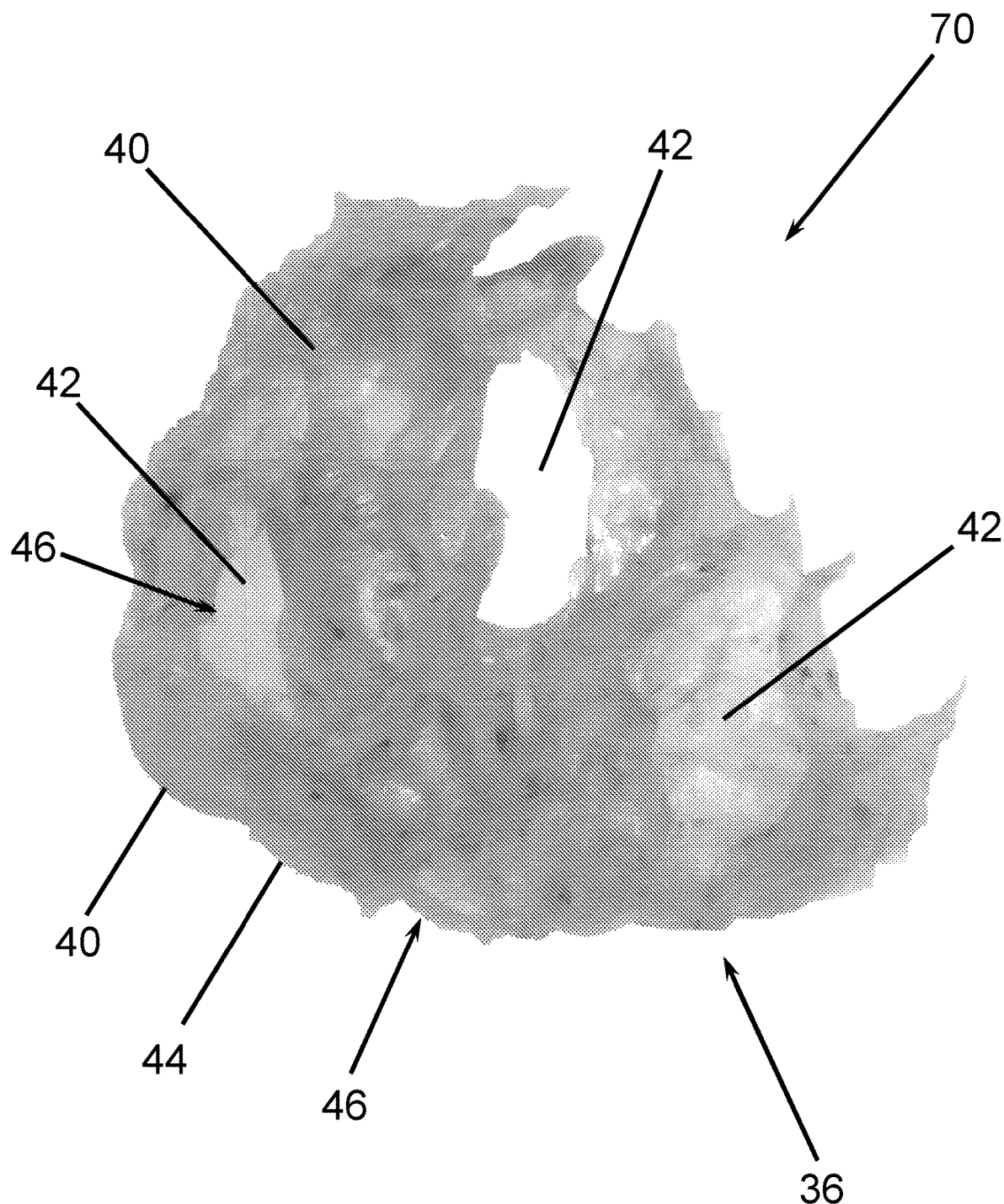
FIG. 5 is an enlarged color microscope photo of a cross-sectional slice of a portion of another extruded pellet.
Figure 7:
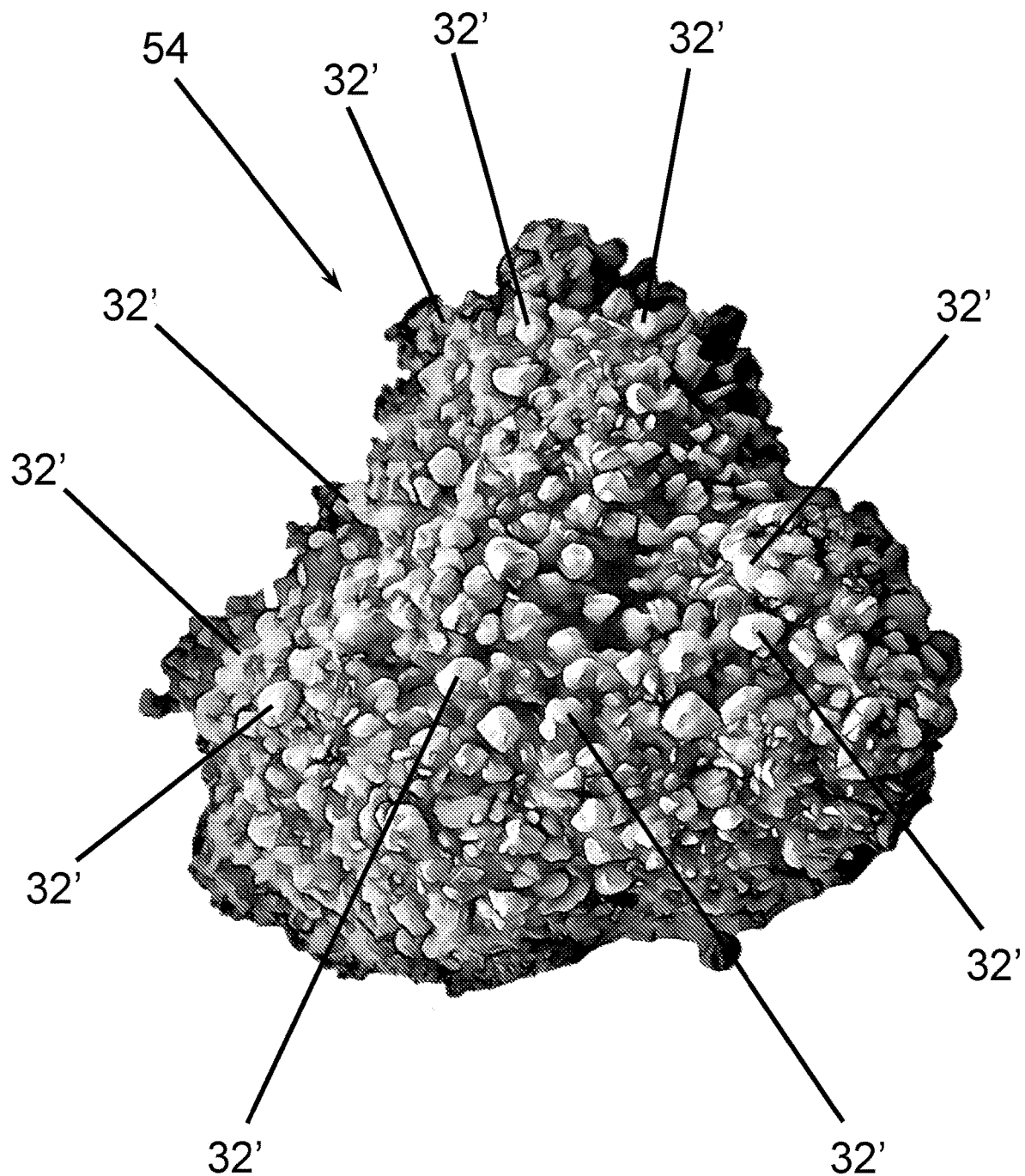
Figure 8:
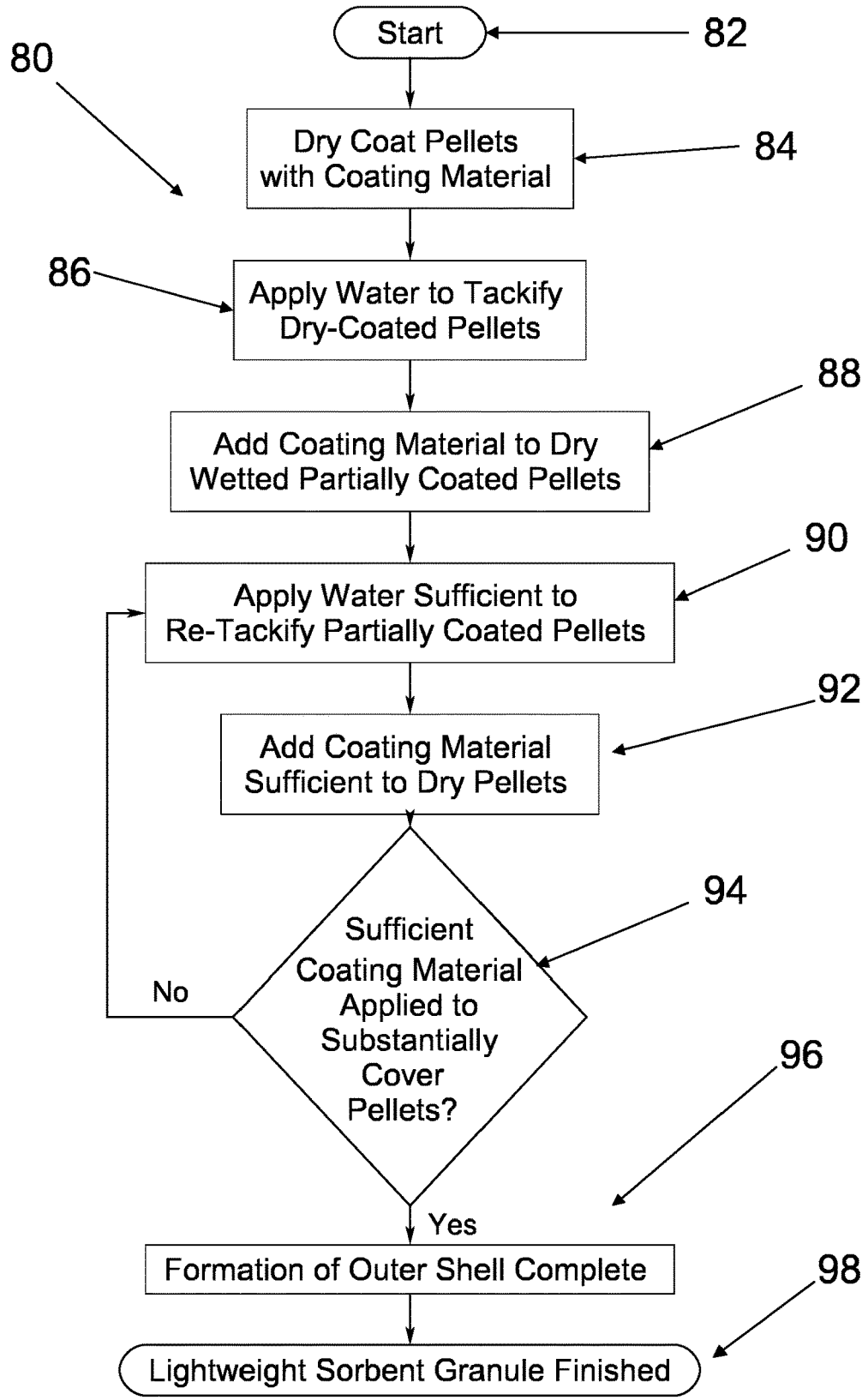

FIG. 7 is an enlarged black and white photo of the clump shown in FIG. 5 after being scooped from the litterbox and the unused granules returned to the litterbox; and FIG. 8 is a schematic diagram illustrating a preferred but exemplary method of making lightweight granular absorbent of the present invention formed by coating extruded pellets with a powdered smectite material forming an outer shell around each pellet producing extruded coated granular absorbent granules well suited for use as litter.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

With reference to FIGS. 1-6, the present invention is directed to lightweight granular sorbent 30 formed of a plurality of lightweight sorbent granules 32, such as best depicted in FIG. 5, each having an outer shell 34 made of a sorbent material 38 heavier in weight and higher in density that which surrounds an inner core 36 made of a sorbent material 40 lighter in weight and lower in density than the shell 34. In a preferred lightweight sorbent granule embodiment, the outer sorbent shell 34 is carried by the inner sorbent core 36, such as by being formed around the core 36, using a forming process in accordance with the present invention that preferably is a coating or agglomerating process to do so. Use of an inner core 36 made of a sorbent material having a density less than the outer sorbent shell 34 reduces the density and hence the weight of lightweight granular sorbent 30 of the present invention while maintaining sorbent performance substantially the same as conventional granular sorbent having sorbent granules formed substantially completely of heavier sorbent shell material.

With reference to FIG. 5, a preferred inner core 36 is not only made of a sorbent material 40 possessing a density less than the sorbent material 38 of the outer shell 34, the core 36 has at least a plurality, preferably at least a plurality of pairs, i.e., at least three, of inner voids or pockets 42, e.g. air pockets, into which liquid, e.g., water and/or urine, can be absorbed, e.g., wicked, during lightweight granular sorbent use enhancing sorbent performance of not just the core 36 but the entire lightweight sorbent granule 32. An outer surface 44 of the core 36 preferably also is of perforate or porous construction having at least a plurality, preferably at least a plurality of pairs, i.e., at least three, of openings or pores 46 formed therein which also enhance sorbent performance of not just the core 24 but the entire lightweight sorbent granule 32. At least a plurality of pores 46 formed in the outer surface 44 of the core 36 preferably each communicate with one of the pockets 42 disposed underneath the outer surface 44 and within the core 36 facilitating increased liquid absorption via wicking, surface tension and/or capillary action during use of lightweight granular sorbent 30 of the present invention.

Figure 6:
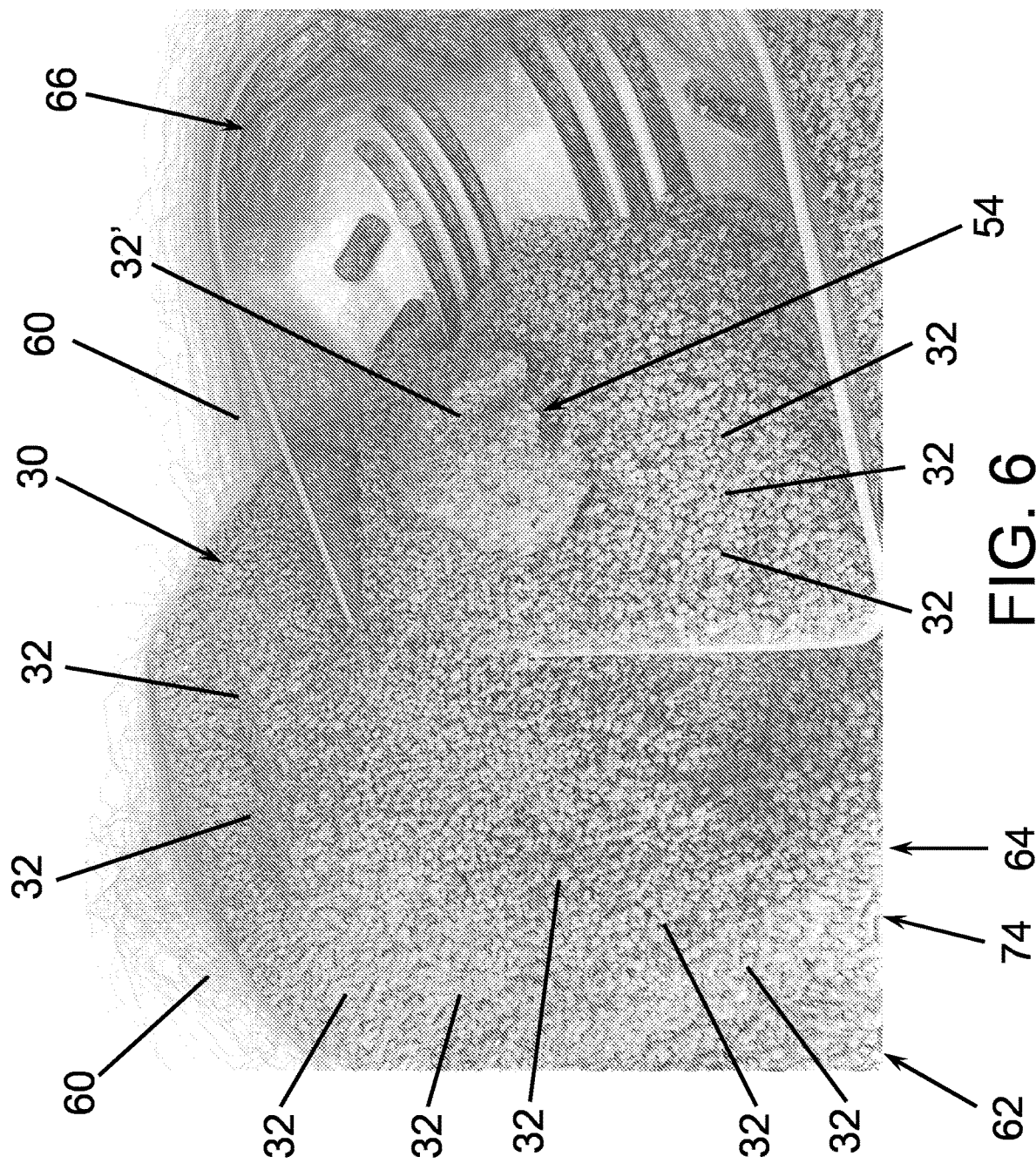
FIG. 6 is a black and white photo showing a perspective fragmentary view of a container, e.g., litter box, filled with lightweight sorbent granules of lightweight granular sorbent of the present invention used as litter with wetted granules forming a clump cleanly scooped from unused granules in the litterbox using a perforate litter scoop.

A preferred outer shell 34 preferably is formed of particles 48 of a sorbent material 38 having a density greater than the sorbent material 40 of the inner core 36 along with binder 50, preferably water soluble binder, that bonds the sorbent particles 48, including to one another, in a binder matrix 52, preferably water soluble binder matrix, producing a shell 34 having a density less than the density of the sorbent material particles 48. In forming the shell 34, water soluble binder 50 not only bonds with the sorbent particles 58 and bonds the sorbent particles 58 to each other, but water soluble binder 50 also adhesively attaches the shell 34 to the core 36. Once the shell 34 is formed, water soluble binder 50 of the shell, e.g., from the shell matrix 52, is available when the shell 34, e.g., sorbent granule 32, is wetted with water, urine, or another liquid, to facilitate attachment to a plurality of other sorbent granules 32 forming a clump 54, such as shown in FIGS. 6 and 7, containing at least a plurality of pairs of, i.e., at least three, stuck together sorbent granules 32.

Binder 50 from at least the outer shell 34, e.g., shell matrix 52, of each lightweight sorbent granule 32 of the invention can be and preferably becomes available when the granule 32 is wetted thereby facilitating clumping of at least a plurality of, preferably at least a plurality of pairs of, i.e., at least three, wetted sorbent granules 32, in forming a clump 54 containing at least a plurality of pairs, i.e., at least three, of sorbent granules 32 that become substantially permanently fixed together at least partially by the binder 50 when the clump 54 dries. When the shell 34 is wetted, such as by water, urine or another liquid, binder 50 in the shell 34, e.g., shell matrix 52, can and preferably at least partially solubilize producing a sticky outer sorbent granule surface 56 by making the outer surface 56 of the sorbent granule 32, i.e., outer surface 56 of the shell 34, tacky enough for adjacent sorbent granules 32 to become stuck to one another enough to form a clump 54 like that shown in FIGS. 6 and 7. Depending on the amount of water, urine or liquid wetting the sorbent granule 32, an amount of water soluble binder 50 of the shell 34, e.g., shell matrix 52, can solubilize, e.g., dissolve, and flow in the form of a flowable adhesive from the wetted sorbent granule 32 around and/or in between adjacent sorbent granules 32 wetting the adjacent sorbent granules 32 with enough flowable adhesive to stick them together and form a clump 54 of water soluble binder adhesively stuck together sorbent granules 32 like that depicted in FIGS. 6 and 7.

A clump 54 formed of at least a plurality of pairs of wetted lightweight sorbent granules 32 of the present invention is held together not only by adhesive attachment between adjacent contacting granules 32 from binder 50 that has solubilized and/or became tacky when granules 32 were wetted, but also from a natural clumping property provided by sorbent material 38 of the shell 34 of wetted granules 32 via adhesion between wetted sorbent material 38 of contacting shells 34 of wetted granules 32. Such adhesion can be via Van Der Waals forces, gelling adhesion, or the like. This two stage clumping adhesion or clumping action, e.g., dual-action clumping, provided by adhesion from binder 50 and adhesion from the clumping property of the shell sorbent material 38 produces clumps 54 having an advantageously high clump retention rate greater than the clump retention rate of conventional granular absorbent, e.g., conventional bentonite-based animal or cat litter (not shown), having conventional sorbent granules (not shown) made substantially completely of the same sorbent material 38 used to form the shell 34 of lightweight sorbent granules 32 of the present invention. Therefore, lightweight sorbent granules 32 made in accordance with the present invention possess a two-stage clumping action or dual-action clumping with one of the stages provided by water-soluble binder 50 in the form of an agglutination water-soluble starch-based binder adhesive clumping action and the other one of the stages provided by wetted swelling or sticky smectite or bentonite adhesive clumping property in the form of a sticky gel clumping action that work together producing dual-action clumping in each granule 32 that causes relatively rapid clumping producing clumps 54 having a desirably high clump retention rate and clump crush strength.

In a preferred embodiment, granular sorbent 30 formed of lightweight sorbent granules 32 of the present invention form clumps 54 of granules 32 wetted with ten milliliters of 2% saline solution that possess a clump retention rate of at least 93%, preferably at least 95%, and more preferably at least 97%, which is greater than the maximum 80%-90% clump retention rate clumps formed of conventional bentonite-based cat litter (not shown) formed of conventional sorbent granules (not shown) each made of solid sodium bentonite possess. In one preferred lightweight granular sorbent embodiment used as cat litter, lightweight sorbent litter 30 of the present invention having lightweight sorbent litter granules 32 wetted with ten milliliters of 2% saline solution form clumps 54 that each possess a clump retention rate of at least 98% and which preferably possess a clump retention rate of at least 99%. In addition to forming clumps 54 having such a desirably high retention rate, clumps 54 formed of lightweight sorbent granules 32 of the present invention wetted with ten milliliters of 2% saline solution are also advantageously strong and crush-resistant having a crush strength of at least 15 pounds per square inch (PSI), preferably at least 20 PSI, and more preferably at least 25 PSI, when dried for at least 5 days to a moisture content of no more than 20% by dried clump weight, preferably no more than about 15% by dried clump weight, and preferably no more than about 12% by dried clump weight. In one preferred lightweight granular sorbent embodiment of the present invention used as scoopable clumping lightweight litter 30 forms clump 54 of litter granules 32 wetted with 2% saline solution that each possess a crush strength of at least 30 pounds per square inch (PSI), preferably at least 35 PSI, and more preferably at least 40 PSI, when dried for at least 5 days to a moisture content of no more than 20% by dried clump weight, preferably no more than about 15% by dried clump weight, and preferably no more than about 12% by dried clump weight.

Clumps 54 with such a desirably high clump retention rate produced from wetted lightweight sorbent granules 32 of lightweight granular sorbent 30, e.g., lightweight litter 30, of the present invention retain more of the wetted or spent sorbent granules 32' (FIGS. 6 and 7) in the clump 54 thereby advantageously leaving behind less spent or used sorbent granules in the litterbox. As a result, when lightweight granular sorbent 30 of the present invention is used as litter, clumps 54 of granular sorbent 30 of the invention advantageously has a least a 93% litter efficiency, preferably at least a 95% litter efficiency, and more preferably at least a 97% litter efficiency by leaving behind virtually no lightweight sorbent granules 32' that have been wetted or spent from the clump 54 as virtually all of the spent granules 32' are retained by or in the clump 54. This causes a given amount or volume of lightweight granular sorbent litter 30 of the present invention to last longer and have less un-clumped wetted or spent litter granules 32' remaining in the litter 30 after clumping and clump removal, which thereby advantageously maximizes litter freshness, extends useful litter life, and minimizes odor.

In a preferred lightweight granular absorbent embodiment well suited for use as litter, at least the outer surface 44 of each core 36 has water soluble binder 50 sufficient to bond with shell sorbent material particles 48, including bonding the particles 48 to each other and to the core 36, when suitably wetted in forming the outer shell 34 around the core 36. In a preferred inner core embodiment, each core 36 also has water soluble binder 50 inside the core 36 with at least some water soluble binder 50 within each core 36 available (a) for helping bond shell sorbent particles 48 to each other and the core 36 in forming the shell 34, and (b) for helping lightweight sorbent granules 32, e.g., litter granules 32, of the invention stick together when wetted and form a clump 54 having such a high retention rate and/or high crush strength.

When used as litter, wetted lightweight sorbent litter granules 32 of the present invention advantageously form a "clean" clump 54 during litter use because the water soluble binder 50 from wetted granules 32 that facilitates clumping by helping wetted litter granules 32 stick to one another also shrinks the clump 54 as the clump 54 air dries before being scooped out. By causing each clump 54 to shrink as the wetted lightweight litter granules 32 dry, clump shrinkage causes the clump 54 to condense in size and create voids between the clump 54 and surrounding granules 32 producing a self-separating clump 54 in accordance with the present invention that reduces contamination of unused or un-spent granules 54 adjacent to and surrounding the clump 54. Where a clump 54 forms adjacent to, on or against a solid surface, such as against a wall 60 or on the bottom of a granular sorbent container 62, e.g., litter pan or litterbox 64, the clump 54 can condense and begin to pull away from the solid surface with which the clump 54 is in contact with. With reference to FIGS. 6 and 7, each clump 54 preferably shrinks at least 3% after being formed from wetted lightweight sorbent litter granules 32 such that each clump 54 shrinks and preferably thereby also condensing the clump 54. When this happens during drying of the clump 54, the clump 54 can condense and pull away from any wall 60 or bottom (not shown) of a granular sorbent container 62 that preferably is a litterbox 64 containing lightweight sorbent litter 30 of the invention as the clump 54 shrinks which can reduce the surface area of contact between the clump 54 and litterbox 64, which in certain instances can reduce clump sticking and can facilitate easier clump removal.

In one preferred lightweight granular sorbent 30 used as lightweight cat litter of the present invention, each clump 54 preferably shrinks at least 5% after formation as the clump 54 dries forming a dried clump 54 that possesses at least 93% clump retention, preferably at least 95% clump retention, and more preferably at least 97% clump retention when dried in accordance with that discussed above regarding clump retention rate producing a "clean" clump which minimizes adherence to the litter box 64 and which minimizes adherence to any part of any removal device 66, e.g., litter scoop 68 (FIG. 6), used to remove the clump 54 when compared to conventional clay-based litter formed of solid bentonite litter granules. In another preferred lightweight granular sorbent 30 of the present invention used as cat litter, each clump 54 preferably shrinks at least 8% while possessing at least 93% clump retention, preferably at least 95% clump retention, and more preferably at least 97% clump retention, producing such a "clean" "non-stick" clump 54 that minimizes adherence to any part of the litterbox 64 or even the litter scoop 68 during clump removal. In still another preferred lightweight granular sorbent 30 of the present invention used as cat litter, each clump 54 preferably shrinks at least 10% while possessing at least 93% clump retention, preferably at least 95% clump retention, and more preferably at least 97% clump retention, producing such a "clean" "non-stick" clump 54 maximizing the removal of dirty litter through higher spent litter granule retention and minimizing adherence to unspent litter granules 32 and contacting solid surfaces.

In a preferred lightweight sorbent core embodiment, the water soluble binder 50 of each core 36 preferably is cold water soluble amylopectin binder that preferably is amorphous cold water soluble amylopectin binder as described in more detail herein. In a preferred lightweight sorbent core embodiment, each lightweight core 36 is formed of a sorbent material 40 different than the sorbent material 38 of the shell 34 with a preferred lightweight core 36 being of organic and/or biodegradable construction. In one preferred lightweight core embodiment, each core 36 is formed of an extruded pellet 70 having a size of no more than 3.5 millimeters in length, width and/or diameter, preferably no more than about 3 millimeters in length, width and/or diameter, extruded with water soluble binder 50 that preferably is cold water soluble amylopectin binder used in forming the shell 34, attaching the shell 34 to the core 36, i.e., attaching the shell 34 to the pellet 70, and facilitating clumping during use of lightweight granular sorbent 30 of the present invention. In one such preferred core embodiment, each core 36 is provided by a pellet 70 extruded from one or more cereal grains having sufficient starch to produce cold water soluble binder 50 that preferably is cold water soluble amylopectin binder from the cereal grain starch during extrusion in an amount sufficient to form the shell 34, bond the shell 34 to the core 36 or pellet 70, and facilitate clumping during granular sorbent, e.g. cat litter, use.

Where inner sorbent cores 36 are formed of such extruded pellets 70, forming the outer shell 34 around each pellet 70 preferably is done using particles 48 of shell sorbent material 38 bonded to one another and the pellet 70 during wetting, e.g., with water, of shell sorbent material particles 48 first applied dry to the pellet 70 to minimize shrinkage of the pellet 70 during forming the shell 34 in making each lightweight sorbent granule 32 such that each resultant lightweight sorbent granule 32 of the present invention preferably has a size at least as great or large as the original size of the pellet 70 prior to shell formation when formation of the shell 34 is finished. One preferred method of forming the shell 34 around the pellet 70 minimizes pellet shrinkage during shell formation producing finished lightweight sorbent granules 32 having a size no greater than the original size of the pellet 70 prior to shell formation when formation of the shell 34 is finished. Another preferred method of forming the shell 34 around the pellet 70 minimizes pellet shrinkage during shell formation producing finished lightweight sorbent granules 32 having a size within ±20% of the original size of the pellet 70 prior to shell formation when formation of the shell 34 is finished.

Because pellets 70 extruded from starch containing material, such as one or more cereal grains, tends to shrink when wetted with water during application of the shell 34, dry coating of each pellet 70 with dry shell sorbent material particles 48 before wetting the dry coated pellet 70 to bond the particles 48 to the pellet 70 advantageously minimizes pellet shrinkage during shell formation. By minimizing pellet shrinkage during shell formation using a method of forming the shell in accordance with the present invention, lighter lower density lightweight sorbent granules 32 are obtained. Such a shell forming or coating method in accordance with the present invention where a dry application of dry shell sorbent material particles 48 to each pellet 70 before applying water advantageously produces lighter less dense lightweight granular sorbent 30 that is well suited for use as lightweight litter 30.

In one embodiment and method of making lightweight granular sorbent of the present invention, dry shell sorbent material particles 48 is applied dry substantially simultaneously to the outer surface 44 of a plurality of pairs, i.e., at least three, of extruded pellets 70 before wetting the applied shell sorbent material particles 48 and outer pellet surfaces 44 to solubilize at least some water soluble binder 50 of each pellet 70 to bond the shell sorbent particles 48 to each other and the pellet 70. At least one more application of dry particulate shell sorbent material 38 to the pellets 70 is done not only to increase shell coating thickness but also to rapidly dry any remaining wetness or moisture before further wetting, e.g., with water, the at least partially coated pellets 70 again. One or more cycles of applying dry particulate shell sorbent material 38 followed by wetting can be performed as needed until a shell 34 formed of pellet water soluble binder 50 bonded with dry particulate shell sorbent material 38 in soluble binder matrix 54 that substantially completely covers each pellet 70 is formed.

In carrying out at least a plurality of dry particulate sorbent shell material application and wetting cycles in one preferred method of making lightweight sorbent granules of the present invention, each lightweight sorbent granule 32, e.g., lightweight sorbent litter, of the present invention has a lightweight sorbent granule size within ±20% of the original size of the pellet 70 that forms the inner core 36 of the granule 32 prior to performing any dry particulate sorbent shell material application and wetting cycle. In another preferred method and embodiment, carrying out at least a plurality of dry particulate sorbent shell material application and wetting cycles, each lightweight sorbent granule 32, e.g., lightweight sorbent litter, of the present invention has a lightweight sorbent granule size no greater than the size of the pellet 70 prior to performing any dry particulate sorbent shell material application and wetting cycle.

In a preferred lightweight granular sorbent embodiment of the present invention, each lightweight inner sorbent core 36 is provided by a sorbent pellet 70 extruded from starch containing material, preferably one or more cereal grains, forming at least 7.5% water soluble binder, preferably at least 10% water soluble binder, more preferably at least 15% water soluble binder, in each pellet 70 by pellet weight as this is an amount of water soluble binder 50 in each pellet sufficient to facilitate forming the outer sorbent shell 34 of each granule 32 in carrying out a preferred method of making lightweight sorbent granules 32 of the invention. This minimum amount of water soluble binder also advantageously is sufficient to work together with the sorbent material 38 of the outer shell 34 to form clumps 54 of lightweight sorbent granules 32 when wetted during sorbent use.

The water soluble binder 50 formed in each pellet 70 during extrusion is formed from starches in a starch containing admixture preferably producing at least 7.5% cold water soluble binder, preferably at least 10% cold water soluble binder, and more preferably at least 15% cold water soluble binder in each pellet 70 by pellet weight. The cold water soluble binder 50 formed in each pellet 70 during extrusion is formed from starches in such a starch containing admixture preferably producing at least 7.5% cold water soluble amylopectin binder, preferably at least 10% cold water soluble amylopectin binder, and more preferably at least 15% cold water soluble amylopectin binder in each pellet 70 by pellet weight. The cold water soluble amylopectin binder 50 formed in each pellet 70 during extrusion is formed from starches in such a starch containing admixture preferably producing at least 7.5% amorphous cold water soluble amylopectin binder, preferably at least 10% amorphous cold water soluble amylopectin binder, and more preferably at least 15% amorphous cold water soluble amylopectin binder in each pellet 70 by pellet weight.

The admixture from which extruded pellets 70 are formed that provide the lightweight inner sorbent cores 36 includes one or more cereal grains, preferably one or more of corn, sorghum and/or wheat, can include a gray or black dye or colorant, and can include cellulose, such as in the form of one or more cellulosic materials and/or cellulose-containing fibers. A preferred admixture contains at least 50% starch containing material in the form of one or more cereal grains and preferably contains no more than 50% cellulose. A preferred starch containing material is formed of at least 50% corn, preferably at least 60%, and more preferably at least 70% by dry admixture weight (before any water is added to the admixture) preferably in comminuted form, such as preferably in the form of cornmeal that can include and preferably does include de-germed cornmeal. Where the admixture includes cellulose or cellulosic material, the remainder of the admixture can be composed of preferred cellulose and cellulosic materials that include one or more of sawdust, pine shavings or fibers, other types of wood shavings or fibers, oat fiber, alfalfa, rice fiber, beet fiber or another type of cellulose or cellulosic fiber. Such an admixture preferably contains no separate binder additive like guar gum, smectite, e.g., bentonite, or the like added specifically to facilitate clumping. One preferred admixture contains no more than 40% cellulose or cellulosic material, e.g., fiber, with the remainder of the admixture substantially completely composed of starch-containing material preferably of or from one or more cereal grains.

In a preferred method of forming an outer sorbent shell 34 around inner sorbent cores 36 that preferably are extruded pellets 70 in making lightweight granular sorbent 30 in accordance with the present invention, dry particulate sorbent shell material 38 is applied dry onto such extruded pellets 70 before wetting the dry applied particulate sorbent shell material 38 and pellets 70 dry-coated with the dry applied particulate shell material 38 with liquid, preferably water. Alternating cycles of application of dry particulate shell material 38 and pellet wetting are performed until each pellet 70 is at least partially, and preferably substantially completely covered in particulate shell material 38. Such a preferred method of forming sorbent shells 34 around cores 36 that are extruded pellets 70 preferably is performed in a coater (not shown) that preferably is an agglomerator, such as a rotating drum agglomerator, configured to dry coat pellets 70 with dry particulate sorbent shell material 38 entering the agglomerator before being wetted, such as with water, before alternatingly applying additional dry particulate sorbent shell material 38 to dry the at least partially coated pellets 70 and then wetting them again at least one and preferably at least a plurality of times. Such a preferred method of producing lightweight coated granular sorbent in accordance with the present invention advantageously minimizes shrinkage and helps prevent densification of the pellets 70 being coated with particulate sorbent shell material 38 by minimizing wetting each at least partially coated pellet 70 thereby minimizing shrinkage in accordance with that discussed above. In one preferred coater embodiment, a mixer that preferably is a vertical or horizontal ribbon blender is used in carrying out the above recited method of forming an outer shell 34 around each core 36 in making finished lightweight sorbent granules 32 of lightweight granular sorbent 30 of the present invention.

A preferred dry particulate shell sorbent material 38 is a smectite, preferably a water-swelling clay or water-swellable clay, preferably a bentonite, and more preferably sodium bentonite. Particles of such smectite used to form the outer shell 34 of each sorbent granule 32 preferably have a size of 50 mesh (U.S.) and smaller, e.g., mesh finer than 50 mesh (U.S.), which preferably is of a mesh size of 100 mesh (U.S.) and smaller, e.g., mesh finer than 100 mesh (U.S.). One preferred dry particulate shell sorbent material 38 is sodium bentonite having a mesh size of at least 150 mesh (U.S.) and smaller, e.g., mesh finer than 150 mesh (U.S.), which preferably is formed of dry particles of sodium bentonite, e.g., powdered bentonite, having a mesh size of at least 200 mesh (U.S.) and smaller, e.g., mesh finer than 200 mesh (U.S.) and preferably between 200 mesh (U.S.) and 300 mesh (U.S.).

In one preferred method of forming sorbent shells 34 around cores 36 of extruded pellets 70 preferably is performed in a coater that preferably is an agglomerator, such as a rotating drum agglomerator, configured to dry coat pellets 70 with dry powdered bentonite 38 having such a small mesh size in accordance with that disclosed in the preceding paragraph as the pellets 70 enter the agglomerator before being wetted with liquid, preferably water, using atomized liquid sprayers directed toward the pellets 70 using turbulently flowing air from one or more pressurized air nozzles. At least one cycle and preferably a plurality of cycles of additional application of dry powdered bentonite 38 to dry the at least partially bentonite powder coated pellets 70 followed by application of additional liquid, e.g., water, using atomized water sprayers whose atomized water spray is directed by turbulently flowing air toward the pellets 70 at a plurality of spaced apart locations along the length of the agglomerator to cover or coat each pellet 70 with an outer sorbent shell 34 formed of powdered bentonite 38 and water soluble binder 50 while also advantageously minimizing pellet shrinkage. In a preferred embodiment, a mixer that preferably is a vertical or horizontal ribbon blender is used in carrying out the above recited method of forming an outer shell 34 around each core 36 in making finished lightweight sorbent granules 32 of lightweight granular sorbent 30 of the present invention.

In such a preferred lightweight granular sorbent embodiment, each lightweight sorbent granule 32 having an outer sorbent shell 34 formed of powdered bentonite 38 and dried water soluble binder 50 possesses a density less than the density of bentonite thereby further reducing density and weight of the resultant lightweight granular sorbent 30 of the present invention. In one preferred embodiment, lightweight sorbent granules 32 are formed that each have an outer shell 34 formed of powdered bentonite 38 bonded together and to an inner core-forming pellet 70 by dried water soluble binder 50 with each outer shell 34 having a bulk density no greater than 58 lbs/ft$^3$, preferably no greater than 55 lbs/ft$^3$, and more preferably no greater than 50 lbs/ft$^3$, which is less than the approximately 60 lbs/ft$^3$ bulk density of bentonite. Not only does the water soluble binder 50 released from each pellet 70 during wetting cycles during shell formation in the agglomerator form a shell matrix 54 bonding particles 48 of powdered bentonite 38 together and to the pellet 70, turbulently flowing air directed toward partially powdered bentonite coated pellets 70 being wetted aerates the outer shell 34 as it is being formed trapping small air pockets in the shell 34 reducing its density thereby advantageously further reducing lightweight sorbent granule density. In a preferred embodiment, a mixer that preferably is a vertical or horizontal ribbon blender can be used in carrying out the above recited method of forming an outer shell 34 around each core 36 in making finished lightweight sorbent granules 32 of lightweight granular sorbent 30 of the present invention.

Lightweight granular sorbent 30 made using such an outer shell forming or coating method to form aerated or foamed sorbent shells 34, e.g., shells formed with at least a plurality of pairs of small air pockets, around inner cores 36, form lightweight sorbent granules 32 in accordance with the present that are well suited for use as clumping animal, pet or cat litter. Clumping of such lightweight litter granules 32 preferably is provided by a two stage clumping mechanism with (a) a first stage provided by water soluble binder 50 released from the outer shell 34 and/or inner core 36, e.g., from extruded starch-containing pellet 70, when wetted with liquid, e.g., water, such as 2% saline solution, urine, and/or liquid fecal matter, and (b) a second stage provided by adhesion between sorbent bentonite 38 in each shell 34 of each wetted litter granule 32 in contact with sorbent bentonite 38 of the shell of an adjacent contacting litter granule 32 that preferably also is wetted. This two stage clumping adhesion provided by adhesion from water soluble binder 50 and adhesion from the clumping property provided by bentonite 38 in each shell 34 of each wetted contacting granule 32 produces clumps 54 having an advantageously high clump retention rate greater than the clump retention rate of conventional bentonite-based litter having solid bentonite litter granules. Such lightweight sorbent cat litter 30 of the present invention advantageously absorbs more water, e.g., 2% saline solution, urine and/or liquid fecal matter, more rapidly than conventional bentonite-based litter having solid bentonite litter granules, forms litter clumps 54 with higher clump retention rates, produces clumps 54 at least partially formed by water soluble binder 50 released from the outer shell(s) and/or inner pellet core(s) of wetted granules 32 that shrink after clump formation during air drying producing "clean" non-stick clumps 54 that do not stick to litter boxes 64 and litter scoops 68, and which produce dried clumps54 having a crush strength greater than clumps formed of solid bentonite litter granules of conventional bentonite-based litter.

Lightweight Granular Sorbent

FIGS. 1-6 illustrate a preferred lightweight granular sorbent 30 of the invention formed of lightweight liquid absorbing granules 32 each having an inner liquid absorbent core 36 surrounded by an outer liquid absorbent shell 34 where the liquid absorbent core 36 is made of a lightweight liquid absorbent material 40 that is void filled and which also can be of porous construction enabling liquid, e.g., water, urine, oils, solvents, and the like, to be absorbed during use of the granular sorbent 30. The inner absorbent core 36 carries the outer absorbent shell 34 with the shell 34 preferably bonded directly to the core 36 with a binder 50, preferably water soluble binder 50, provided by the core 36, which also can and preferably does facilitate clumping during granular sorbent, e.g., litter, use. The inner core 36 made of a liquid absorbing material 40 different than the particulate liquid absorbing material 38 of the shell 34 with the particulate liquid absorbing material 38 of the shell 34 being heavier and higher in density than the liquid absorbing material 40 of the lightweight inner core 36.

Figure 1:
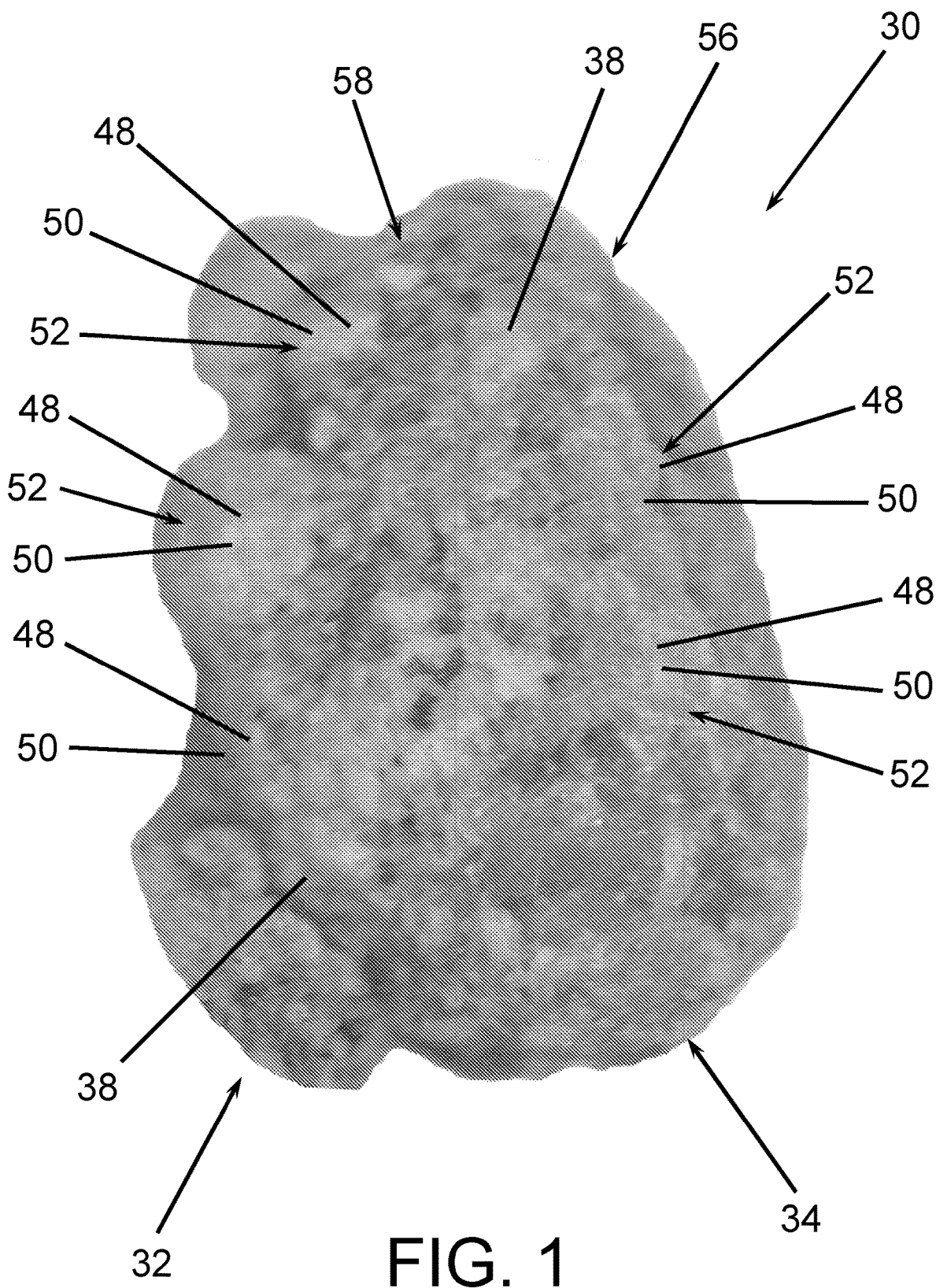
FIG. 1 is an enlarged color microscope photo of a preferred lightweight sorbent granule of the present invention.
Figure 2:
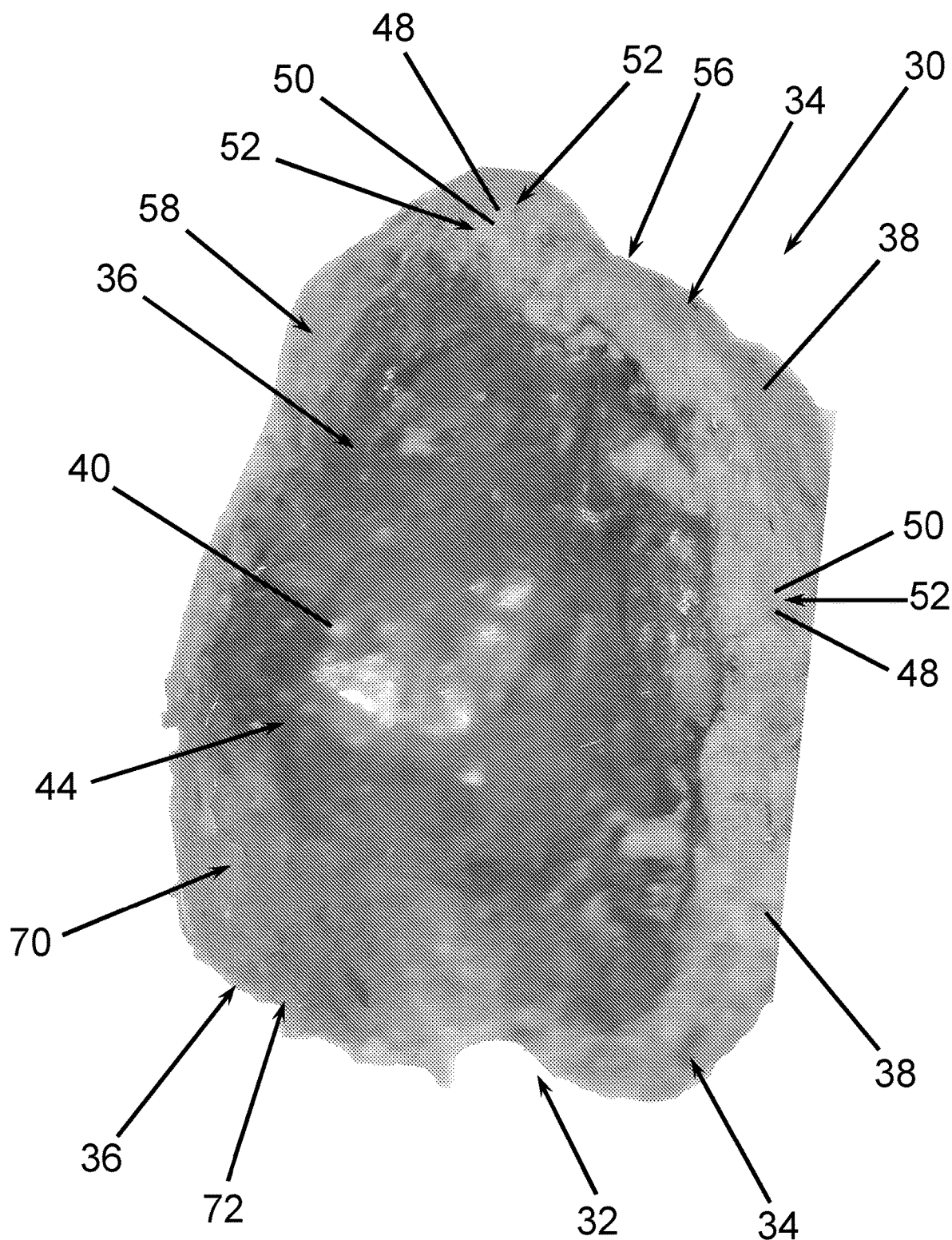
FIG. 2 is an enlarged color microscope photo of another lightweight sorbent granule of the invention with a portion of an outer sorbent shell of the granule removed showing part of an inner lightweight core around which the outer sorbent shell is disposed.
Figure 3:
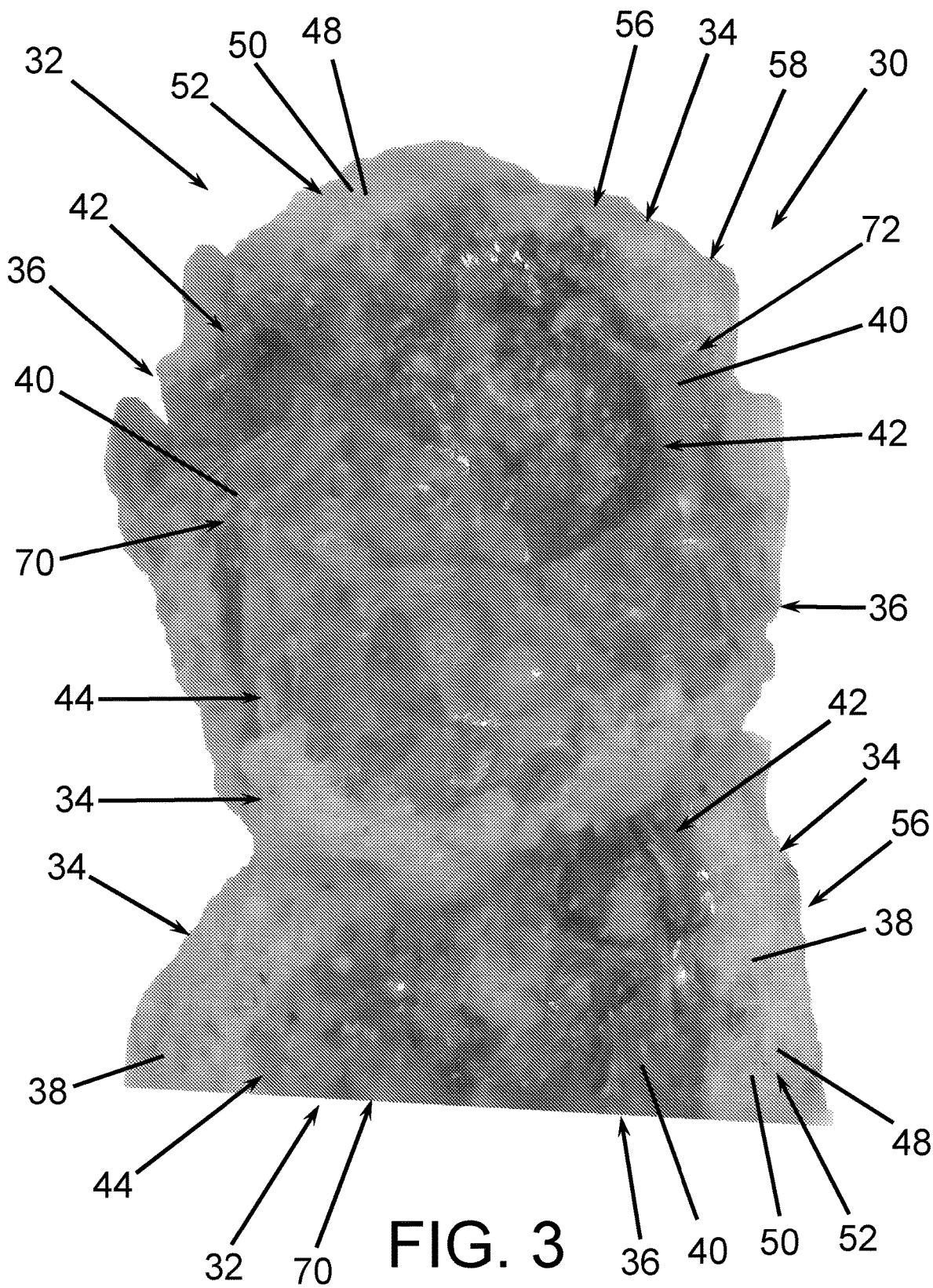
FIG. 3 is an enlarged color microscope photo of a cross-sectional slice of one lightweight sorbent granule of the invention in contact with a portion of another lightweight sorbent granule taken through both the outer shell and part of each inner lightweight core of each lightweight sorbent granule.
Figure 4:
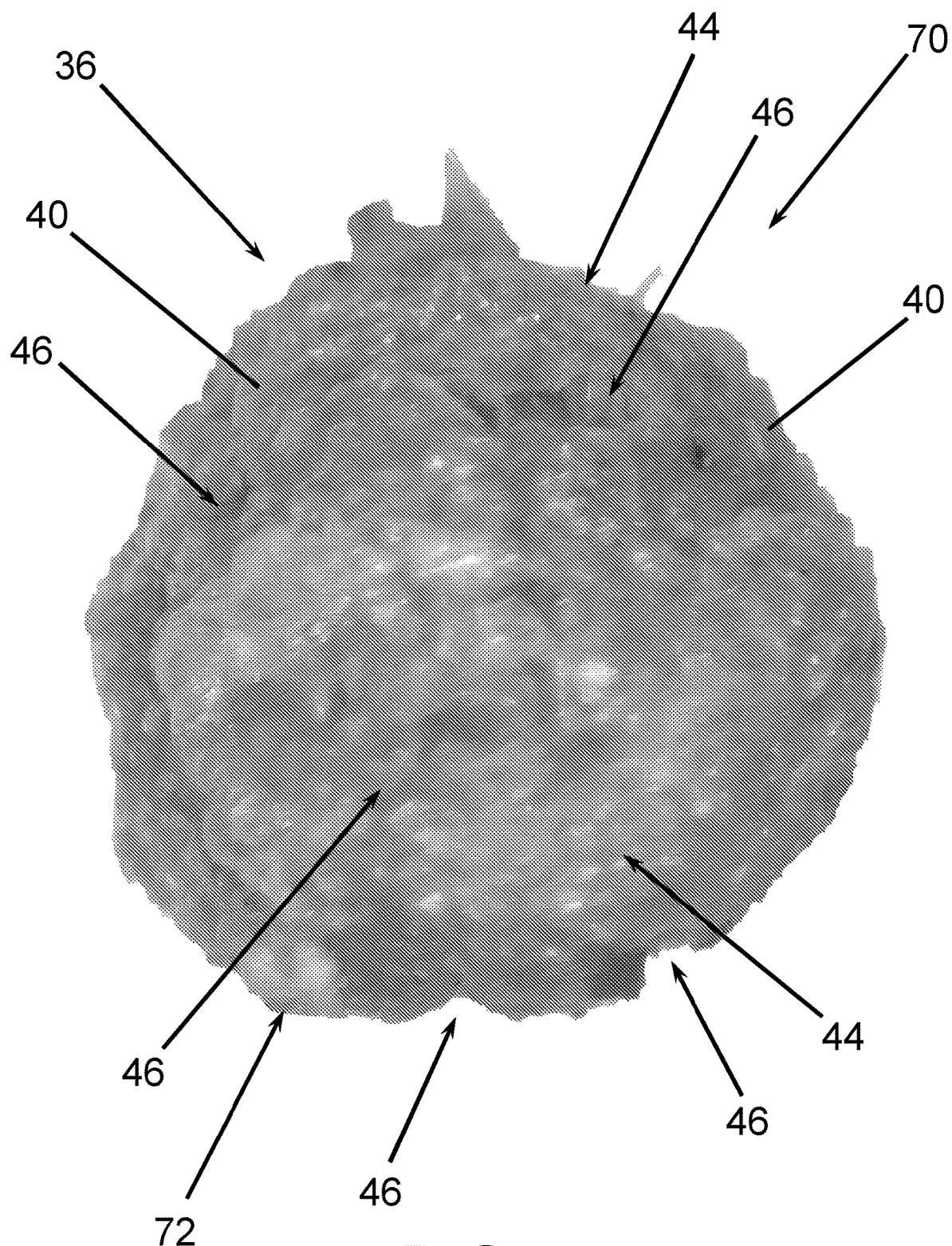
FIG. 4 is an enlarged color microscope photo of a preferred lightweight core formed of an extruded pellet around which a sorbent shell is formed in making a lightweight sorbent granule of the invention.

FIG. 1 illustrates a preferred lightweight liquid absorbent granule 32 of the present invention that preferably is a litter granule 32, preferably an animal, pet or litter granule 32. With additional reference to FIGS. 1-3, each granule 32 preferably is of irregularly shaped construction having an uneven irregular three-dimensionally contoured outer surface 56 formed by the outer liquid absorbing shell 34 at least partially covering and preferably substantially completely encasing an inner liquid absorbing core 36 that preferably also is of irregularly shaped construction also having an uneven irregular three-dimensionally contoured outer surface 44. Each irregularly shaped three-dimensionally contoured outer surface 44 of the inner liquid absorbing core 36 provides a three-dimensional outer shell form or shell former 72 to which the outer liquid absorbing shell 34 substantially conforms during forming of the shell 34 on and around the core 36.

The shell 34 formed around a lightweight core 36 formed of an organic material with a preferred lightweight core 36 formed an extruded starch-containing pellet 70 producing granular sorbent 30 of the present invention formed of at least a plurality of pairs, i.e., at least three, of the lightweight sorbent granules 32 made in accordance with the present invention that is lighter in weight and which absorbs at least as well as conventional smectite granular sorbent composed of sorbent granules made substantially completely of smectite. With specific reference to FIGS. 6 and 7, lightweight granular sorbent 30 in accordance with the present invention is well suited for use as lightweight sorbent litter 74, preferably animal, pet or cat litter 74, whose lightweight sorbent granules 32 disposed in a litterbox 66 form a clump 54 of granules 32 when wetted with a liquid, such as water, urine or liquid fecal matter, during litter use.

Lightweight sorbent granules 32 of lightweight granular sorbent 30 of the present invention can be used to pick up liquid and other material, e.g., fecal matter, coming into contact with the granules 32 when disposed on the ground or in a receptacle 62, such as the litter box 64 shown in FIG. 5. Such lightweight clumping granular sorbent 30 formed of sorbent granules 32 of the present invention is particularly well suited for use as animal litter 74, pet litter 74 or cat litter 74. Sorbent granules 32 of granular sorbent 30 can also be used in other sorbent applications including sorbent applications where sorbent granules 32 are poured on or otherwise applied onto liquid and/or other material at a site or location sought to be treated, e.g., remediation site, such that the granular sorbent 30 is used to pick up the liquid and/or other material sought to be removed from the remediation site or location. Such lightweight granular sorbent 30 composed of lightweight sorbent granules 32 made in accordance with the present invention is therefore also well suited for use as oil absorbent. Such lightweight granular sorbent 30 composed of lightweight sorbent granules 32 of the present invention can also be used in waste and water treatment applications.

Each lightweight sorbent granule 32 is made of a lightweight core 36 around which a sorbent outer shell 34 of smectite 38, preferably bentonite, is formed. The outer smectite shell 36 substantially completely covers an outer surface 44 of the core 36, such as in the manner depicted in FIGS. 1-3. In a preferred embodiment, the outer shell 34 substantially completely covers substantially the entire outer surface 44 of each lightweight core 36 such that smectite 38 can and preferably does substantially completely encapsulate substantially the entire outer surface 44 of the core 36 when application of smectite 38 to the core 36 is completed. As is discussed in more detail below, particulate or granular smectite 38 is applied substantially simultaneously onto at least a plurality of pairs, i.e., at least three, lightweight cores 36 using a coater that preferably is an agglomerator (not shown) using an agglomerating method used to make lightweight granular sorbent 30 in accordance with the invention having lightweight sorbent granules 32 each formed of a lightweight core 36 carrying an outer smectite shell 34 surrounding the core 36 that preferably is composed of bentonite 38. If desired, a mixer that preferably is a vertical or horizontal ribbon blender can be used instead of an agglomerator in carrying out the above recited method of forming an outer shell 34 around each core 36 in making finished lightweight sorbent granules 32 of lightweight granular sorbent 30 of the present invention.

Each lightweight sorbent granule 32 of lightweight granular sorbent 30 of the present invention has a relatively rough uneven outer granule surface 56 providing a relatively rough uneven outer surface appearance that is similar to that of conventional litter granules made of solid bentonite, but which possesses a bulk density that is at least 40% less, preferably at least 50% less, than the bulk density of such solid bentonite litter granules. Such lightweight sorbent granules 32 of lightweight sorbent 30 of the present invention therefore not only look similar to solid bentonite litter granules of conventional bentonite-based cat litter but also advantageously performs substantially similar, preferably performs substantially the same, despite weighing at least 40% less, preferably weighing at least 50% less, than conventional cat litter made with conventional solid bentonite litter granules.

In a preferred lightweight sorbent granule embodiment, each lightweight sorbent granule 32 of the present invention has an outer granule surface 56 of smectite 38, preferably bentonite, more preferably sodium bentonite, with an outer granule surface area that is substantially the same as the outer surface area of a conventional solid sodium bentonite granule, i.e., conventional solid sodium bentonite litter granule, of the same granule size. As a result, sorption, absorption and/or adsorption, of liquid, e.g., water, by lightweight sorbent granules 32 of the present invention occurs at least as fast, preferably faster, than occurs with conventional solid sodium bentonite granules. In addition, absorption of water and urine occurs at least as fast and preferably faster. The water absorption capacity of such lightweight sorbent granules 32 of the invention preferably also is at least as great as, preferably greater than, the water absorption capacity of litter made with conventional solid sodium bentonite granules.

In one such preferred lightweight sorbent granule embodiment, each lightweight sorbent granule 32 of the present invention has an outer granule surface 56 of smectite 38, preferably bentonite, more preferably sodium bentonite, with an outer granule surface area that is at least 5%, preferably at least 10%, and more preferably at least 15%, greater than the outer surface area of a conventional solid sodium bentonite granule, i.e., conventional solid sodium bentonite litter granule, of the same granule size. As a result, sorption, absorption and/or adsorption, of liquid, e.g., water, by lightweight sorbent granules 32 of the present invention occurs at least as fast, preferably faster, than occurs with conventional solid sodium bentonite granules. In addition, absorption of water and urine occurs at least as fast and preferably faster. The water absorption capacity of such lightweight sorbent granules 32 of the invention preferably also is at least as great as, preferably greater than, the water absorption capacity of litter made with conventional solid sodium bentonite granules.

In at least one preferred embodiment, lightweight granular sorbent 30 is formed of lightweight sorbent granules 32 of the invention each having a water absorbent lightweight core 36 that also includes water-soluble binder 50 that facilitates at least one of (a) coating or agglomerating each core 36 with smectite 38, preferably bentonite, e.g., sodium bentonite, and (b) clumping of wetted sorbent granules 32 during sorbent use of the light weight granular sorbent 30 of the present invention. In one such preferred embodiment, each water absorbent lightweight core 36 contains enough water-soluble binder 50 such that wetting of cores 36 during application of smectite 38, preferably bentonite, more preferably sodium bentonite, facilitates smectite application thereby facilitating outer shell formation. In another such preferred embodiment, each water absorbent lightweight core 36 contains enough water-soluble binder 50 such that wetting of lightweight sorbent granules 32 during sorbent use of the lightweight granular sorbent 30 of the present invention facilitates formation of a clump 54 of at least a plurality of pairs, i.e. at least three, of sorbent granules 32 at least partially glued together by water-soluble binder 50 from wetted sorbent granules 32.

In a further such preferred embodiment, each water absorbent lightweight core 36 has water-soluble binder sufficient to not only facilitate application of the smectite 38, preferably bentonite, more preferably sodium bentonite, onto each core 36 but also provides each finished lightweight sorbent granule 32 with water-soluble binder 50 sufficient to form a clump 54 of at least a plurality of pairs, i.e., at least three, of wetted lightweight sorbent granules 32. Each lightweight sorbent granule 32 preferably has enough water soluble binder 50 provided by its lightweight core 36 for at least some of the water-soluble binder 50 of each granule 32 to solubilize or dissolve when the granule 32 is wetted to produce a flowable adhesive that flows from the wetted granule(s) 32 around and in between adjacent granules 32 binding them together forming a clump 54. Formation of such a clump 54 advantageously enables removal of clumped together spent granules 32 after having fulfilled their intended sorbent function of picking up, i.e., via absorption and/or adsorption, of liquid in any other materials sought to be removed, e.g., remediated.

Lightweight Core Construction

A preferred lightweight core 36 is made of a lightweight weight material 40 that is void filled and which also can be of porous construction enabling liquid, e.g., water, urine, oils, solvents, and the like, to be adsorbed and/or absorbed by, preferably into, each core 36 of a lightweight sorbent granule 32 covered with an outer smectite shell 34 constructed in accordance with the present invention during lightweight granular sorbent use. A preferred lightweight core 36 is made of a suitably low density material 40 having a bulk density no greater than one-fourth of the bulk density of the smectite 38, preferably bentonite, more preferably sodium bentonite, used to form the outer sorbent granule shell 34 of each lightweight sorbent granule 32. In one preferred embodiment, each core 36 has a bulk density no greater than one-fifth of the bulk density of the smectite 38 forming the outer shell 34. In another preferred embodiment, each core 36 has a bulk density no greater than about one-sixth of the bulk density of the smectite 38 forming the outer shell 34. In still another preferred embodiment, each lightweight core 36 has a bulk density no greater than about one-tenth of the bulk density of the smectite 38 forming the outer shell 34.

A preferred lightweight core 36 is made of an organic material that preferably includes one or more starches, which can include protein, and which can also include cellulose, such as in the form of cellulosic fiber, e.g., oat fiber, pine fiber, paper, beet fiber, rice fiber, sawdust, etc. such that each lightweight core 36 has a bulk density that is no greater than one-fourth the bulk density of the smectite 38, preferably bentonite, more preferably sodium bentonite, used to form the outer sorbent granule shell 34 of each lightweight sorbent granule 32. Such a preferred lightweight core 36 formed of an organic material preferably is not just light in weight but preferably advantageously also is biodegradable. In one preferred embodiment, each core 36 has a bulk density no greater than one-fifth of the bulk density of the smectite 38 forming the outer shell 34. In another preferred embodiment, each core 36 has a bulk density no greater than about one-sixth of the bulk density of the smectite 38 forming the outer shell 34. In still another preferred embodiment, each lightweight core 36 has a bulk density no greater than about one-tenth of the bulk density of the smectite 38 forming the outer shell 34.

Where the smectite 38 used to form the outer shell 34 around each lightweight core 36 is composed of a swelling clay, such as preferably bentonite clay, more preferably sodium bentonite, having a bulk density of approximately 60 lbs/ft$^3$, each lightweight core 36 has a bulk density no greater than 18 lbs/ft$^3$. Such a lightweight granular sorbent 30 preferably has sorbent granules 32 each formed of (a) no less than 60% swelling clay, preferably bentonite clay, more preferably sodium bentonite, and (b) no more than 60% of such a lightweight core 36 having such a relatively low bulk density no greater than 18 lbs/ft$^3$ (i.e., no greater than one-fourth the bulk density of the outer shell material) by lightweight sorbent granule weight. One such preferred granular sorbent embodiment has lightweight sorbent granules 32 made of between 80% and 60% swelling clay, preferably bentonite clay, more preferably sodium bentonite, and between 20% and 40% of such a lightweight core 36 having such a relatively low bulk density no greater than 18 lbs/ft$^3$ (i.e., no greater than one-fourth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 20 lbs/ft$^3$ and 45 lbs/ft$^3$, preferably between 25 lbs/ft$^3$ and 40 lbs/ft$^3$, more preferably between 27 lbs/ft$^3$ and 32 lbs/ft$^3$, and which preferably is not less than 60% of the bulk density of conventional granular sorbent made of conventional sorbent granules formed substantially completely of such smectite, i.e., granules formed of solid smectite.

Where the smectite 38 used to form the outer shell 34 around each lightweight core 36 is composed of a swelling clay, such as preferably bentonite clay, more preferably sodium bentonite, having a bulk density of approximately 60 lbs/ft$^3$, each lightweight core 36 preferably has a bulk density no greater than 15 lbs/ft$^3$. Such a lightweight granular sorbent 30 preferably has sorbent granules 32 each formed of (a) no less than 60% swelling clay, preferably bentonite clay, more preferably sodium bentonite, and (b) no more than 60% of such a lightweight core 36 having such a relatively low bulk density no greater than 15 lbs/ft$^3$ (i.e., no greater than one-fourth the bulk density of the outer shell material) by lightweight sorbent granule weight. One such preferred granular sorbent embodiment has lightweight sorbent granules 32 made of between 80% and 60% swelling clay, preferably bentonite clay, more preferably sodium bentonite, and between 20% and 40% of such a lightweight core 36 having such a relatively low bulk density no greater than 15 lbs/ft$^3$ (i.e., no greater than one-fourth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 20 lbs/ft$^3$ and 45 lbs/ft$^3$, preferably between 25 lbs/ft$^3$ and 40 lbs/ft$^3$, more preferably between 27 lbs/ft$^3$ and 32 lbs/ft$^3$, and which preferably is not less than 60% of the bulk density of conventional granular sorbent made of conventional sorbent granules formed substantially completely of such smectite, i.e., granules formed of solid smectite.

In a preferred lightweight granular sorbent embodiment, each outer shell 34 of each lightweight sorbent granule 32 is made of a smectite or swelling clay, preferably bentonite clay, more preferably sodium bentonite, having a bulk density of approximately 60 lbs/ft$^3$ and each lightweight core 36 has a bulk density no greater than 12 lbs/ft$^3$. Such a lightweight granular sorbent 30 preferably has sorbent granules 32 each formed of (a) no more than 70% swelling clay, preferably bentonite clay, more preferably sodium bentonite, (forming outer shell 34), and (b) no more than 40% of such a lightweight core 36 having such a relatively low bulk density no greater than 12 lbs/ft$^3$ (i.e., no greater than one-fifth the bulk density of the outer shell material) by lightweight sorbent granule weight. One such preferred granular sorbent embodiment has lightweight sorbent granules 32 made of between 70% and 60% swelling clay, preferably bentonite clay, more preferably sodium bentonite, and between 30% and 40% of such a lightweight core 36 having such a relatively low bulk density no greater than 12 lbs/ft$^3$ (i.e., no greater than one-fourth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 20 lbs/ft$^3$ and 40 lbs/ft$^3$, preferably between 25 lbs/ft$^3$ and 35 lbs/ft$^3$, more preferably between 27 lbs/ft$^3$ and 32 lbs/ft$^3$, and which preferably is no greater than 50% of the bulk density of conventional granular sorbent made of sorbent granules formed substantially completely of such smectite.

In another preferred lightweight granular sorbent embodiment, each outer shell 34 is made of swelling clay, preferably bentonite clay, more preferably sodium bentonite, having a bulk density of about 60 lbs/ft$^3$ and each lightweight core 36 has a bulk density no greater than 10 lbs/ft$^3$. Such a lightweight granular sorbent 30 preferably has sorbent granules 32 each formed of (a) no more than 90% swelling clay, preferably bentonite clay, more preferably sodium bentonite, (e.g., forming outer shell 34), and (b) no more than 30% of such a lightweight core 36 having such a relatively low bulk density no greater than 10 lbs/ft$^3$ (i.e., no greater than one-sixth the bulk density of the outer shell material) by lightweight sorbent granule weight. One such preferred granular sorbent embodiment has lightweight sorbent granules 32 made of between 90% and 70% swelling clay, preferably bentonite clay, more preferably sodium bentonite, and between 10% and 30% of such a lightweight core 36 having such a relatively low bulk density no greater than 10 lbs/ft$^3$ (i.e., no greater than one-sixth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 25 lbs/ft$^3$ and 35 lbs/ft$^3$, preferably between 27 lbs/ft$^3$ and 32 lbs/ft$^3$, and which preferably is no greater than 60% of the bulk density of conventional granular sorbent made of sorbent granules formed substantially completely of such smectite.

In still another preferred lightweight granular sorbent embodiment, each outer shell 34 is made of swelling clay, preferably bentonite clay, more preferably sodium bentonite, having a bulk density of about 60 lbs/ft$^3$ and each lightweight core 36 has a bulk density no greater than 6 lbs/ft$^3$. Such a lightweight granular sorbent 30 preferably has sorbent granules 32 each formed of (a) no more than 90% swelling clay, preferably bentonite clay, more preferably sodium bentonite, (e.g., forming outer shell 34), and (b) no more than 30% of such a lightweight core having such a relatively low bulk density no greater than 6 lbs/ft$^3$ (i.e., no greater than one-tenth the bulk density of the outer shell material) by lightweight sorbent granule weight. One such preferred granular sorbent embodiment has lightweight sorbent granules 32 made of between 90% and 70% swelling clay, preferably bentonite clay, more preferably sodium bentonite, and between 10% and 30% of such a lightweight core 36 having such a relatively low bulk density no greater than 6 lbs/ft$^3$ (i.e., no greater than one-sixth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 25 lbs/ft$^3$ and 35 lbs/ft$^3$, preferably between 27 lbs/ft$^3$ and 32 lbs/ft$^3$, and which preferably is no greater than 60% of the bulk density of conventional granular sorbent made of sorbent granules formed substantially completely of such smectite.

Each lightweight core 36 preferably is made of a relatively lightweight, low density material 40 in accordance with that discussed above that providing a lighter lower density core 36 around which a heavier high density smectite outer shell 34 is formed producing a lightweight granular sorbent 30 in accordance with the invention having a density greater than the lightweight core 36 but less than the smectite outer shell 34. In a preferred embodiment, each lightweight core 36 is made of such a relatively lightweight, low density material 40 encapsulated by heavier higher density smectite outer shell 34 produces lightweight clumping granular sorbent 30 of the present invention having a bulk density of between 30% and 65% of the bulk density of the smectite forming the outer sorbent granule shell.

In such a preferred embodiment where the smectite is sodium bentonite, lightweight granular sorbent 30 formed of lightweight sorbent granules 32 of the present invention have a bulk density of between 25 lbs/ft$^3$ and 35 lbs/ft$^3$ before anything else is added to produce a final lightweight granular sorbent product in accordance with the invention that is packaged and sold for commercial and/or retail use. Such lightweight granular sorbent 30 of the present invention has a bulk density of between 25 lbs/ft$^3$ and 35 lbs/ft$^3$ before any other component(s) or constituent(s) is added, e.g., blended with the sorbent granules 32, to produce the final granular sorbent product that is packaged and sold for commercial and/or retail use. In one embodiment, the final granular sorbent product after all other components and/or constituents are mixed with, blended with, and/or otherwise added to the lightweight sorbent granules 32 has a bulk density of between 25 lbs/ft$^3$ and 35 lbs/ft$^3$.

In one such preferred embodiment, where the smectite is sodium bentonite, lightweight clumping granular sorbent 30 formed of lightweight clumping sorbent granules 32 of the present invention preferably have a bulk density of between 27 lbs/ft$^3$ and 32 lbs/ft$^3$ before anything else is added to the final lightweight granular sorbent of the invention that is packaged and sold for commercial and/or retail use. Such lightweight clumping granular sorbent of the present invention has a bulk density of between 27 lbs/ft$^3$ and 32 lbs/ft$^3$ before any other component(s) or constituent(s) is added, e.g., blended with the sorbent granules 32, to produce the final granular sorbent product that is packaged and sold for commercial and/or consumer use. In one embodiment, the final granular sorbent product after all other components and/or constituents are mixed with, blended with, and/or otherwise added to the lightweight sorbent granules 32 has a bulk density of between 27 lbs/ft$^3$ and 32 lbs/ft$^3$.

Despite being so much lighter in weight, lightweight granular sorbent 30 formed of lightweight sorbent granules 32 of the present invention possesses water absorption capacity of at least 80%, preferably at least 90%, and more preferably substantially the same as the water absorption capacity as conventional granular sorbent, i.e., cat litter, formed of litter granules made substantially completely of bentonite, i.e., made of solid bentonite. In another preferred embodiment, lightweight granular sorbent 30 formed of lightweight sorbent granules 32 have a water absorption capacity that is greater, preferably at least 5% greater, than the water absorption capacity as conventional granular sorbent, i.e., cat litter, formed of litter granules made substantially completely of bentonite, i.e., made of solid bentonite. Despite being so much lighter in weight, lightweight granular sorbent 30 formed of lightweight sorbent granules 32 of the invention each having an outer smectite shell 34 such that lightweight sorbent granules 32 clump when wetted with water, e.g., urine, at least as well as conventional smectite granular sorbent, i.e., litter, having sorbent granules, i.e., litter granules, made substantially completely of smectite, i.e., made of solid bentonite.

Such lightweight granular sorbent 30 produced in accordance with the present invention that also forms clumps 54 when wetted is well suited for use as litter, preferably animal or cat litter. Where such lightweight clumping granular sorbent 30 of the present invention is used as cat litter, the final granular sorbent product or cat litter in accordance with the present invention, can include one of more of the following components or constituents in addition to the lightweight clumping sorbent granules 32: calcium carbonate, e.g., limestone, silica, e.g., quartz, baking soda, charcoal and/or activated carbon, scents, colorants, etc. Where such lightweight clumping granular sorbent 30 of the present invention is used as cat litter, the final granular sorbent product or cat litter contains no more than 10%, preferably no more than about 7%, of such other components or constituents by final granular sorbent product or cat litter weight.

In the past, prior attempts to reduce the weight of granular sorbents and cat litter in particular have primarily relied upon mixing granules of smectite, typically made of solid sodium bentonite, with other separate discrete lighter particles having a lower bulk density than the smectite. Particles made of lighter weight materials, such as cellulosic materials like paper, e.g., recycled newsprint, wood fiber, plant fiber, grain fiber, etc., and the like have been used in the past to reduce the total bulk density of the final product, e.g., final litter product, packaged and sold for commercial and/or consumer use. While the mixing or blending of such particles of lighter weight lower density materials with bentonite granules produces litter that is lighter in weight, the lighter weight lower density particles contribute very little, if anything, to granular sorbent performance. While such lower weight lesser density particles may even be somewhat water absorbent, they typically are far less water absorbent than the bentonite granules. Since these lightweight particles are separate and discrete from the solid bentonite granules of the conventional granular sorbent, transport after packaging can cause solid bentonite particles to undesirably separate from the lightweight particles stratifying them into layers which can adversely impact performance, efficiency and usage. If stratification or separation becomes too great, quite often it will lead to a significant amount of the lighter weight lower density particles being thrown away because they typically perform so poorly compared to the solid bentonite granules.

Even where such lower weight lesser density particles are somewhat absorptive, they often migrate away from the bentonite granules during sorbent use. Where used on land, wind can blow the lighter lower density particles away from the location where the conventional granular sorbent was applied defeating the purpose of adding the lightweight particles in the first place. Where used in water, such as when cleaning up spills, the lighter weight of these lower density particles can cause them to float away from the bentonite granules once again defeating the purpose for adding the particles in the first place. Where these lighter weight particles do not float away, they can become saturated with water, oil, etc. and sink to the bottom. This not only defeats the purpose for adding them to the solid bentonite granules, it actually can make the spill or contamination worse by spreading it to a location that is even more difficult to remediate.

When used in litter, such lower weight lesser density particles also do nothing to facilitate clumping as such lower weight lesser density particles actually quite often impede clumping. In fact, such lower weight lesser density particles typically do not clump at all such that they often do not readily attach themselves to clumps formed when conventional solid bentonite litter granules are wetted with water or urine. Not only does this adversely affect litter clumping ability, but any clumps produced with such conventional litter typically have a clump retention rate of less than 85%, if not lower. Litter having such a low clump retention rate is undesirable because it means that individual solid bentonite granules and lightweight particles that were also wetted ended up being left behind in the litter box as contaminated un-clumped litter. As a result, a significant amount of contaminated litter remains behind after each clump is scooped out of the litter box resulting in the left behind contaminated litter producing order, facilitating bacterial and mold growth, as well as undesirably sticking to part of the litter box. When this happens, removal of contaminated un-clumped litter can end up requiring the removal of all litter from the litter box in order to clean the litter box to remove any lingering orders caused by the contaminated un-clumped litter.

The use of lightweight cores 36 as a nucleus around which a shell 34 of smectite 38, preferably bentonite, more preferably sodium bentonite, is formed overcomes the many disadvantages of such prior attempts to produce lightweight granular sorbent including prior attempts to produce lightweight cat litter. Lightweight cores 36 used in making lightweight granular sorbent 30 of the present invention not only contribute to the sorbent performance of lightweight sorbent granules 32 while simultaneously reducing sorbent weight, such lightweight cores 36 constructed in accordance with the present invention also advantageously facilitates clumping. The result is a light weight granular sorbent 30 formed of lightweight sorbent granules 32 of the invention that is well suited for use as scoopable clumpable cat litter 74.

Suitable lightweight cores 36 can be and preferably are formed of pellets 70 that can be round, disc-shaped, half-moon shaped, concave, convex, generally cylindrical, elongate, and/or even irregularly shaped with such lightweight core-forming pellets 70 typically being a mixture of such pellets 70 having different shapes and sizes preferably each no larger than 3.5 millimeters in size. Each such pellet 70 preferably is made of an organic sorbent material 40 that preferably includes one or more starches, can include protein, and which can and preferably does also include cellulose, preferably in the form of cellulosic fiber, such as a plant fiber, e.g., grass fiber, grain fiber, or the like. Each lightweight core-forming pellet 70 not only provides a lighter weight lower density core 36 around which an outer sorbent shell 34 is formed to produce a lighter weight lower density sorbent granule 32 of the invention, each pellet 70 also functions as a smectite nucleator or granule nucleus that facilitates formation and attachment of smectite 38, preferably bentonite, more preferably sodium bentonite, during carrying out a method of making lightweight granular sorbent 30 in accordance with the present invention. Each of these differently shaped pellets 70 provide coating or agglomeration coating or agglomeration forms or former 72 about which relatively small particles or granules 48 of smectite 38, preferably bentonite, more preferably sodium bentonite, adhere during carrying out a preferred method of making lightweight granular sorbent 30 of the present invention producing correspondingly differently shaped lightweight sorbent granules 32 of the invention.

Each pellet 70 used as a lightweight core 36 is liquid absorbent, preferably absorbing at least a plurality of times the weight of the pellet 70 in water or urine when pellets 70 lacking any outer absorbent shell 34 are wetted with water or urine. This advantageously produces lightweight granular sorbent 30 in accordance with the present invention where the lightweight core 36 inside each lightweight sorbent granule 32 itself absorbs or is capable of absorbing at least a plurality of times the corresponding weight of the core 36 within the granule 32 when the granule 32 is wetted with water or urine. In one preferred embodiment, each pellet 70 used as a lightweight core 36 absorbs at least three times pellet weight in water or urine producing lightweight sorbent granules 32 each having a pellet 70 forming a nucleus of the granule 32 that provides a lightweight water absorbent core 36 that absorbs at least three times the weight of the core 36 in water or urine during lightweight granular sorbent use.

In one such preferred embodiment, each pellet 70 used as a lightweight core 36 absorbs or is capable of absorbing at least 3.5 times pellet weight of water or urine, and preferably absorbs or is capable of absorbing between 3.5 and 5.5 times pellet weight of water or urine. In such a preferred embodiment, each pellet 70 used as a lightweight core 36 absorbs at least 3.5 times pellet weight, preferably between 3.5. and 5.5 times pellet weight, in water or urine producing lightweight sorbent granules 32 of the invention each having a pellet 70 forming a nucleus of each lightweight sorbent granule 32 that provides a lightweight water absorbent core 36 that absorbs at least 3.5 times, preferably between 3.5 and 5.5 times, the weight of the core 36 in water or urine during lightweight granular sorbent use.

With specific reference to the pellet slice or cross-section shown in FIG. 5, each pellet 70 used as a lightweight core 36 preferably is void filled having at least a plurality of pairs, i.e., at least three, of voids or pockets 42, e.g., air pockets 42, within the interior of the pellet 70 each capable of holding liquid, e.g., water or urine, during lightweight sorbent granule use in picking up or absorbing such liquid. With specific reference to the whole pellet 70 shown in FIG. 4, to further facilitate liquid absorption, each pellet 70 used as a lightweight core 36 has a porous outer surface 44 with at least a plurality of pairs, i.e., at least three, pores 46 formed in the outer pellet surface 44. At least a plurality of the pores 46 in the outer surface 44 of each pellet 70 can be and preferably are in fluid flow communication with at least one of the internal voids or pockets 42 disposed inside each pellet 70 helping facilitate liquid absorption during lightweight sorbent granule use by enabling liquid to flow, and preferably be drawn, e.g., by wicking, capillary action, or via surface tension, into at least one of the pores 46 and be wicked or otherwise flow, e.g., be drawn, into one of the internal voids or pockets 42 increasing the liquid holding or carrying capacity of each pellet 70 thereby advantageously increasing the liquid holding or carrying capacity lightweight of each sorbent granule 32.

As a result, the component or constituent of lightweight sorbent granules 32 of the lightweight granular sorbent 30 of the present invention that reduces weight and density, namely the pellets 70 that form the lightweight granule core 36 of each granule 32 is advantageously functional by being liquid absorbent. In a preferred lightweight granular sorbent 30, such lightweight sorbent granules 32 formed of pellets 70 that provide the lightweight density-reducing sorbent granule cores 36 are liquid absorbent granules 32 that absorb at least 3 times lightweight sorbent granule weight in water or urine and preferably absorb at least 3.5 times lightweight sorbent granule weight in water or urine while achieving a weight or bulk density reduction (in the resultant lightweight sorbent granules 32, e.g., lightweight sorbent litter granules 32, produced with the cores 36) of at least 40%, preferably at least 50%, compared to conventional granular absorbent, e.g., conventional cat litter, formed of solid smectite sorbent granules, e.g., convention solid litter granules. In one such preferred lightweight granular sorbent 30, such lightweight sorbent granules 32 formed of pellets 70 that provide the lightweight density-reducing sorbent granule cores 36 are liquid absorbing granules 32 that absorb at least 3 times lightweight sorbent granule weight in water or urine and preferably absorb at least 3.5 times lightweight sorbent granule weight in water or urine while achieving a weight or bulk density reduction of at least 40%, preferably at least 50%, compared to the weight or bulk density of the solid bentonite sorbent granules, e.g., solid bentonite litter granules, used in conventional granular absorbent, e.g., conventional litter.

In another preferred lightweight granular sorbent 30, such lightweight sorbent granules 32 formed of pellets 70 that provide the lightweight density-reducing sorbent granule cores 36 are liquid absorbing granules 32 that absorb at least 4 times lightweight sorbent granule weight of water or urine and preferably absorb at least 4.5 times lightweight sorbent granule weight of water or urine while achieving a weight or density reduction of at least 40%, preferably at least 50%, compared to conventional absorbent, e.g., conventional cat litter, formed of solid smectite sorbent granules, e.g., conventional solid smectite litter granules. In one such preferred lightweight granular sorbent 30, such lightweight sorbent granules 32 formed of pellets 70 that provide the lightweight density-reducing sorbent granule cores 36 are liquid absorbing granules 32 that absorb at least 4 times lightweight sorbent granule weight in water or urine and preferably absorb at least 4.5 times lightweight sorbent granule weight in water or urine while achieving a weight or bulk density reduction of at least 40%, preferably at least 50%, compared to the weight or bulk density of the solid bentonite granules, e.g., solid bentonite litter granules, used in conventional granular absorbent, e.g., conventional litter. In other words, the lightweight granular sorbent 30 uses pellets 70 that provide weight reducing cores 36 which carry a denser sorbent shell 34 where the primary weight reducing component, namely the cores 36, not only reduce weight but also provide absorbent properties producing a lightweight granular sorbent 30 in accordance with the present invention that performs at least as good as, if not better than, conventional granular sorbent formed of solid smectite sorbent granules.

In a preferred lightweight core embodiment, each pellet 70 that forms the lightweight absorbent core 36 of each lightweight sorbent granule 32 of the present invention has at least some water soluble binder 50 at, along, or in the outer surface 44 of the pellet 70 to facilitate adhesion of smectite 38, preferably bentonite, more preferably sodium bentonite, to the pellet 70 during application of relatively small particles 48 of smectite 38, preferably bentonite, more preferably sodium bentonite, to the outer surface 44 of the pellet 70 when the pellet 70 is wetted preferably with water. When each pellet 70 is wetted, at least some of the water soluble binder 50 at or along the outer surface 44 of the pellet 70 also is wetted becoming tacky producing a sticky outer pellet surface 44 to which the relatively small particles 48 of the granular or powdered smectite 38, preferably granular or powdered bentonite, more preferably granular or powdered bentonite, sticks or adheres in applying the smectite 38, preferably bentonite, more preferably sodium bentonite, on the pellet core 36 to form the outer sorbent shell 34 in making lightweight sorbent granules 32 in accordance with the present invention. In one lightweight sorbent granule making method and embodiment, each pellet 70 contains sufficient water soluble binder 50 to not only make the outer pellet surface 44 sufficiently tacky for smectite 38, preferably bentonite, more preferably sodium bentonite, to adhere to the outer pellet surface 44 but which remains and thereby functions like concrete that cements the particles 48 of smectite 38, preferably bentonite, more preferably sodium bentonite, in place to one another and to the pellet core 36. When the wetted water soluble binder 50 hardens around the applied particles 48 of smectite 38, preferably bentonite, attaching them to each pellet core outer surface 44 and each other, the hardened water soluble binder forms a structural matrix 52 of the outer shell 34. At least a portion of this structural matrix 52 of the sorbent outer shell 34 of each lightweight sorbent granule 32 is water soluble thereby solubilizing or dissolving when wetted during sorbent use making the outer surface 56 of each wetted granule 32 sticky or tacky helping clump at least a plurality of pairs, i.e. at least three, of wetted lightweight sorbent granules 32 together during sorbent use.

In one such preferred embodiment, the outer surface 44 of each pellet 70 not only contains such water soluble binder 50 but each pellet 70 also contains water soluble binder 50 inside each pellet 70 enabling a sufficient amount of the binder 50 to solubilize when wetted with liquid, preferably water during application of smectite 38, preferably bentonite, more preferably sodium bentonite, facilitating adhesion and fixing of smectite 38, preferably bentonite, more preferably sodium bentonite, thereto. In such a preferred embodiment, water soluble binder 50 can be and preferably is disposed in and can form at least a portion of at least a plurality of the internal voids or pockets 42 within each pellet 70 and preferably also is disposed in and can form at least a portion of at least a plurality of the pores 46 in the outer surface 44 of each pellet 70.

Each pellet 70 preferably contains water soluble binder 50 in an amount sufficient to not only aid in attaching and fixing relatively small particles 48, e.g., powder, of smectite 38, preferably bentonite, more preferably sodium bentonite, to the outer pellet surface 44 in carrying a preferred method of making lightweight granular sorbent 30 of the invention in a manner that encases each pellet 70 within a solidified substantially hard ready-to-absorb outer sorbent shell 34. When the binder 50 forming the structural shell matrix 52 has sufficiently dried and cured thereby solidifying and fixing in place particles 48, e.g., powder, of smectite 38, preferably bentonite, more preferably sodium bentonite, including such particles 48 e.g., powder, of smectite 38, preferably bentonite, more preferably sodium bentonite, which have merged together, the hardened ready-to-absorb outer sorbent, e.g., smectite, shell 34 is formed.

When such lightweight sorbent granules 32 of lightweight granular sorbent 30 in accordance with the present invention are wetted, such as with water or urine, water soluble binder 50 in the matrix 52 of the outer shell 34 of each granule 32 solubilizes or dissolves making the outer granule surface 56 tacky or sticky facilitating clumping. In one preferred embodiment, each lightweight sorbent granule 32 of the present invention contains water soluble binder 50 in an amount sufficient to solubilize and release binder 50 in the form of a flowable adhesive when wetted enabling the flowable adhesive formed by solubilized binder 50 to flow from each wetted granule 32 around and in between a plurality of adjacent granules 32 helping clump them together.

In one preferred embodiment, each pellet 70 has at least 7.5% water soluble binder 50 by pellet weight providing sufficient water soluble binder 50 at or along the outer pellet surface 44 to facilitate application and adhesion of relatively small sorbent particles 48, e.g., powder, of smectite 38, preferably bentonite, more preferably sodium bentonite, to each pellet 70 in carrying out a preferred method of making lightweight granular sorbent 30 of the invention. Such an amount of water soluble binder 50 preferably also advantageously is sufficient to promote clumping by producing lightweight sorbent granules 32 of the invention having an outer smectite shell 34 held together by water soluble binder 50 migrated from the wetted uncoated pellet 70 during application of particles 48, e.g., powder, of smectite 38, preferably bentonite, more preferably sodium bentonite, in making each granule 32 with the water soluble binder 50 in the shell 34 and/or in the pellet 70 becoming substantially instantly available when the granule 32 is wetted during sorbent use helping clump adjacent sorbent granules 32 together.

In another preferred embodiment, each pellet 70 has at least 10% water soluble binder 50 by pellet weight providing sufficient water soluble binder 50 at or along the outer pellet surface 44 to facilitate application and adhesion of relatively small sorbent particles 48, e.g., powder, of smectite 38, preferably bentonite, more preferably sodium bentonite, to each pellet 70 in carrying out a preferred method of making lightweight granular sorbent 30 of the invention. Such an amount of water soluble binder 50 preferably also advantageously is sufficient to promote clumping by producing lightweight sorbent granules 32 of the invention having an outer smectite shell 34 held together by water soluble binder 50 migrated from the wetted uncoated pellet 70 during application of particles 48, e.g., powder, of smectite 38, preferably bentonite, more preferably sodium bentonite, in making each granule 32 with the water soluble binder 50 in the shell 34 and/or in the pellet 70 becoming substantially instantly available when wetted during sorbent use helping clump adjacent sorbent granules 32 together.

In still another preferred embodiment, each pellet 70 has at least 15% water soluble binder 50 by pellet weight providing sufficient water soluble binder 50 at or along the outer pellet surface 44 to facilitate application and adhesion of relatively small sorbent particles 48, e.g., powder, of smectite 38, preferably bentonite, more preferably sodium bentonite, to each pellet 70 in carrying out a preferred method of making lightweight granular sorbent 30 of the invention. Such an amount of water soluble binder 50 preferably also advantageously is sufficient to promote clumping by producing lightweight sorbent granules 32 of the invention having an outer smectite shell 34 held together by water soluble binder 50 migrated from the wetted uncoated pellet 70 during application of particles 48, e.g., powder, of smectite 38, preferably bentonite, more preferably sodium bentonite, in making each granule 32 with the water soluble binder 50 in the shell 34 and/or in the pellet 70 becoming substantially instantly available when the granule 32 wetted during sorbent use helping clump adjacent sorbent granules 32 together.

In still another preferred embodiment, each pellet 70 has at least 20% water soluble binder 50 by pellet weight providing sufficient water soluble binder 50 at or along the outer pellet surface 44 to facilitate application and adhesion of relatively small sorbent particles 48, e.g., powder, of smectite 38, preferably bentonite, more preferably sodium bentonite, to each pellet 70 in carrying out a preferred method of making lightweight granular sorbent 30 of the invention. Such an amount of water soluble binder 50 preferably also advantageously is sufficient to promote clumping by producing lightweight sorbent 30 of the invention having an outer smectite shell 34 held together by water soluble binder 50 migrated from the wetted uncoated pellet 70 during application of particles 48, e.g., powder, of smectite 38, preferably bentonite, more preferably sodium bentonite, in making each granule 32 with water soluble binder 50 in the shell 34 and/or in the pellet 70 becoming substantially instantly available when wetted during sorbent use helping clump adjacent sorbent granules 32 together.

Extruded Lightweight Core

A preferred lightweight core 36 is an extruded core made of an extruded pellet 70 formed of an admixture containing one or more cereal grains having sufficient starch to form enough water soluble binder 50 in each extruded pellet 70 from starch in the admixture modified, preferably physically modified, during extrusion into water-soluble binder to facilitate adhesion and fixing of relatively small particles 48, e.g., powder, of smectite 38, preferably bentonite, more preferably sodium bentonite, to the outer pellet surface 44 in forming the outer shell 34 surrounding each pellet 70 in making each lightweight sorbent granule 32 that preferably is lightweight extruded coated granular absorbent of the invention. Water-soluble binder 50 in each lightweight sorbent granule core forming pellet 70 not only facilitates coating or agglomeration of smectite 38, preferably bentonite, more preferably sodium bentonite, in forming the outer shell 34, each lightweight sorbent granule 32 has sufficient water-soluble binder 50 available to promote clumping with other sorbent granules 32 when wetted.

Such a preferred lightweight extruded core 36 made of such an extruded pellet 70 formed of such an admixture containing one or more cereal grains having enough starch to form sufficient water soluble binder 50 in each extruded pellet 70 by physical modification of starches during extrusion, produces an extruded pellet 70 having water-soluble material in an amount at least as much and preferably greater than the amount of water-soluble binder 50 formed in each pellet 70 during extrusion. The presence of such water soluble material in each lightweight sorbent granule 32, including water-soluble material remaining in each lightweight sorbent granule core forming pellet 70 after the outer shell 34 has been applied, advantageously facilitates more rapid and more efficient absorption of water during lightweight granular sorbent use.

The water soluble content of each extruded pellet 70 disclosed herein, including below, is specified in terms of a percentage of the extruded pellet weight indicating what weight percentage of the pellet 70 is composed of modified starch, preferably starch modified during pellet extrusion, which is water soluble when wetted with water, e.g., urine, at room temperature or colder, i.e., 75° Fahrenheit or colder, which preferably is cold water-soluble as known in the field of starch chemistry. The water soluble content of each extruded pellet 70 includes starch modified during extrusion to become water-soluble, preferably cold water soluble, and includes amylopectin in the admixture modified during extrusion into cold water soluble amylopectin. The water soluble content of each extruded pellet 70 is inclusive of any water soluble binder 50 present in the extruded pellet 70.

The water soluble binder content of each extruded pellet 70 disclosed herein, including below, is specified in terms of a percentage of the extruded pellet weight indicating what weight percentage of the pellet 70 is composed of modified starch, preferably starch modified during pellet extrusion, which is (a) water soluble when wetted with water at room temperature or colder, i.e., 75° Fahrenheit or colder, and which preferably is cold water-soluble as known in the field of starch chemistry, and (b) which functions as a binder or glue. Such water solubility of water soluble binder 50 formed in each extruded pellet 70 extends above room temperature as well as above that which generally defines cold water starch solubility, as water soluble binder present in extruded pellets 70 remains water soluble at temperatures as high as 110° Fahrenheit providing real world urine solubility by dissolving in cat urine having a temperature as high as 105° Fahrenheit that typically is no higher than about 103° Fahrenheit. The water soluble binder content of each extruded pellet 70 includes starch modified during extrusion to become water-soluble binder 50, preferably cold water soluble binder, and includes amylopectin in the admixture modified during extrusion into cold water soluble amylopectin binder.

A preferred extruded core 36 made of such an extruded pellet 70 is formed by extruding an admixture containing one or more cereal grains, preferably one or more of corn, sorghum and/or wheat, without any separate binder additive or smectite in the admixture, at an extruder temperature and pressure at or above which it is sufficient to extrude expanded or puffed pellets 70 each having at least 15% water soluble content by pellet weight and at least 7.5% water soluble binder content by pellet weight sufficient to not only facilitate application of relatively small particles, e.g., powder, of smectite 38, preferably bentonite, more preferably sodium bentonite, in forming the outer absorbent shell 34 as well as facilitating absorption and clumping of wetted lightweight sorbent granules 32 of the present invention.

Another preferred extruded core 36 made of such an extruded pellet 70 is formed by extruding an admixture containing one or more cereal grains, preferably one or more of corn, sorghum and/or wheat, without any separate binder additive or smectite in the admixture, at an extruder temperature and pressure at or above which it is sufficient to extrude pellets 70 each having at least 15% water soluble content by pellet weight and at least 10% water soluble binder content by pellet weight. Still another preferred extruded core 36 made of such an extruded pellet 70 is formed by extruding an admixture containing one or more cereal grains, preferably one or more of corn, sorghum and/or wheat, without any separate binder additive or smectite in the admixture, at an extruder temperature and pressure at or above which it is sufficient to extrude pellets 70 each having at least 20% water soluble content by pellet weight and at least 10% water soluble binder content by pellet weight. A further preferred extruded core 36 made of such an extruded pellet 70 is formed by extruding an admixture containing one or more cereal grains, preferably one or more of corn, sorghum and/or wheat, without any separate binder additive or smectite in the admixture, at an extruder temperature and pressure at or above which it is sufficient to extrude pellets 70 each having at least 20% water soluble content by pellet weight and at least 15% water soluble binder content by pellet weight. A still further preferred extruded core 36 made of such an extruded pellet 70 is formed by extruding an admixture containing one or more cereal grains, preferably one or more of corn, sorghum and/or wheat, without any separate binder additive or smectite in the admixture, at an extruder temperature and pressure at or above which it is sufficient to extrude pellets 70 each having at least 25% water soluble content by pellet weight and at least 15% water soluble binder content by pellet weight. Yet another preferred extruded core 36 made of such an extruded pellet 70 is formed by extruding an admixture containing one or more cereal grains, preferably one or more of corn, sorghum and/or wheat, without any separate binder additive or smectite in the admixture, at an extruder temperature and pressure at or above which it is sufficient to extrude pellets 70 each having at least 25% water soluble content by pellet weight and at least 20% water soluble binder content by pellet weight.

The water soluble content of each extruded pellet 70 preferably is composed of amorphous cold water soluble amylopectin material and the water soluble binder content of each extruded pellet 70 preferably is formed of amorphous cold water soluble amylopectin binder having a molecular weight less than that of the unmodified amylopectin starch of the cereal grain or cereal grains of the admixture from which each pellet 70 was extruded. In a preferred extruded pellet embodiment, the water soluble content of each extruded pellet 70 preferably is composed of amorphous cold water soluble amylopectin material and the water soluble binder content of each extruded pellet 70 preferably is formed of amorphous cold water soluble amylopectin binder having a molecular weight less than that of the unmodified amylopectin starch of the cereal grain or cereal grains of the admixture from which each pellet 70 was extruded and preferably a mean molecular weight within ±25% of the mean molecular weight of the unmodified amylose starch of the cereal grain or cereal grains of the admixture from which each pellet 70 was extruded.

Each extruded pellet 70 can be and preferably is composed with at least 3%, preferably at least 5%, of a dextrin-like water soluble adhesive binder that preferably is a cold water soluble adhesive binder having a mean molecular weight within ±25% of the mean or average molecular weight of dextrin. In a preferred extruded pellet embodiment, each pellet 70 has at least 3%, preferably at least 5%, of a dextrin-like cold water soluble binder having a molecular weight within ±25% of 504.43708 g/mol (i.e. the CAS molecular weight of dextrin). In another preferred extruded pellet embodiment, each pellet 70 has at least 3% dextrin and preferably has at least 5% dextrin by pellet weight.

A preferred extruded core 36 made of an extruded pellet 70 is formed by extruding an admixture containing one or more cereal grains, preferably one or more of corn, sorghum and/or wheat, at an admixture moisture content of no greater than 30%, preferably with no water added in the extruder during extrusion at an extruder temperature of at least 100° Celsius and an extruder pressure of at least 900 pounds per square inch to extrude a plurality of extruded pellets 70 per second of extruder operation with each extruded pellet 70 having a water soluble content of at least 15% by pellet weight containing at least 7.5% water soluble binder 50 by pellet weight. Another preferred extruded core 36 made of an extruded pellet 70 is formed by extruding an admixture containing one or more cereal grains, preferably one or more of corn, sorghum and wheat, at an admixture moisture content of no greater than 25%, preferably with no water added in the extruder during extrusion at an extruder temperature of at least 120° Celsius and an extruder pressure of at least 1,000 pounds per square inch to extrude a plurality of extruded pellets 70 per second of extruder operation with each extruded pellet 70 having a water soluble content of at least 18% by pellet weight containing at least 10% water soluble binder 50 by pellet weight. Still another preferred extruded core 36 made of an extruded pellet 70 is formed by extruding an admixture containing one or more cereal grains, preferably one or more of corn, sorghum and wheat, at an admixture moisture content of no greater than 23%, preferably with no water added in the extruder during extrusion at an extruder temperature of at least 125° Celsius and an extruder pressure of at least 1,100 pounds per square inch to extrude a plurality of extruded pellets 70 per second of extruder operation with each extruded pellet 70 having a water soluble content of at least 20% by pellet weight containing at least 13% water soluble binder 50 by pellet weight.

Each extruded pellet 70 can be and preferably is composed of or with at least 3%, preferably at least 5%, more preferably at least 7.5%, of a dextrin-like water soluble adhesive binder that preferably is a cold water soluble adhesive binder having a mean molecular weight within ±25% of the mean or average molecular weight of dextrin. In a preferred extruded pellet embodiment, each pellet 70 has at least 3%, preferably at least 5%, more preferably at least 7.5%, of a dextrin-like cold water soluble binder having a molecular weight within ±25% of 504.43708 g/mol. In another preferred extruded pellet embodiment, each pellet 70 has at least 3% dextrin by pellet weight, preferably has at least 5% dextrin by pellet weight, and more preferably has at least 7.5% dextrin by pellet weight.

A preferred extruded pellet 70 used as a lightweight core 36 around which the sorbent shell 34 is formed is extruded from one or more cereal grains and has at least 15% cold water soluble content by pellet weight and preferably has at least 7.5%, preferably at least 10%, more preferably at least 13%, cold water soluble binder content by pellet weight with the water soluble binder content present in each pellet 70 preferably being cold water soluble modified amylopectin starch binder 50 that preferably is an amorphous cold water soluble amylopectin starch binder. Preferably, each pellet 70 used as a lightweight core 36 has at least 15% cold water solubles by pellet weight and at least 7.5%, preferably at least 10%, more preferably at least 13%, cold water soluble binder formed of cold water soluble amylopectin starch binder, preferably cold water soluble amorphous amylopectin starch binder, formed of amylopectin starch modified so its molecular weight has been reduced to a molecular weight of between $8 \times 10^4$ and $10^6$ g/mol. In another preferred embodiment, each pellet 70 used as a lightweight core 36 in making lightweight sorbent granules 32 of the invention has a cold water soluble content of at least 15% by pellet weight and a cold water soluble amylopectin starch binder content of at least 7.5%, preferably at least 10%, more preferably at least 13%, formed of reduced molecular weight modified amylopectin having a degree of polymerization falling between 500 and 6,000 glucose units. In one such preferred embodiment, each pellet 70 used as a lightweight core 36 in making lightweight sorbent granules 32 of the invention has a cold water soluble content of at least 15% by pellet weight and a cold water soluble amylopectin starch binder content of at least 7.5%, preferably at least 10%, more preferably at least 13%, formed of reduced molecular weight modified amylopectin having a molecular weight falling between $8 \times 10^4$ and $10^6$ g/mol and a degree of polymerization falling between 500 and 6,000 glucose units.

Where the lightweight-core forming pellet 70 is extruded from an admixture of one or more starch-containing cereal grains, such a preferred pellet 70 also has starch damage in an amount of at least 50%, preferably at least 60%, and more preferably at least 70%, as measured in accordance with AOAC: 2002.02, as substantially the entirety of the cold water soluble amylopectin binder, preferably cold water soluble amorphous amylopectin binder, formed in each extruded pellet 70 is physically modified cold water soluble amylopectin starch binder formed by physically modifying unmodified amylopectin starch present in the cereal grain admixture whose molecular weight is reduced to between $8 \times 10^4$ and $10^6$ g/mol forming at least 7.5%, preferably at least 10%, and more preferably at least 13%, of such physically modified cold water soluble amylopectin starch binder that preferably is physically modified amorphous cold water soluble amylopectin starch binder. In one preferred extruded pellet embodiment, each extruded pellet 70 has starch damage in an amount of at least 50%, preferably at least 60%, and more preferably at least 70%, as measured in accordance with AOAC: 2002.02, as substantially the entirety of the water soluble binder formed in each pellet 70 during pellet extrusion is cold water soluble amylopectin binder, preferably cold water soluble amorphous amylopectin binder, formed in formed of physically modified cold water soluble amylopectin starch binder by physically modifying unmodified amylopectin starch present in the cereal grain admixture whose molecular weight is reduced to between $8 \times 10^4$ and $10^6$ g/mol and/or has a degree of a degree of polymerization falling between 500 and 6,000 glucose units forming at least 7.5%, preferably at least 10%, and more preferably at least 13%, of such physically modified cold water soluble amylopectin starch binder by pellet weight that preferably is physically modified amorphous cold water soluble amylopectin starch binder.

Each such core-forming extruded pellet 70 preferably also has a water activity level of no greater than 0.4, and preferably no greater than 0.35, as such a water activity level is indicative of the advantageous water sorption properties each pellet 70 possesses, even when covered by a smectite 38 sorbent outer shell 34. In addition, such a lower water activity level is also indicative not only of the long shelf life lightweight sorbent granules 32 possess but also its advantageously long useful sorbent life after being applied. This is because lightweight sorbent granules 32 formed of lightweight cores 36 provided by such extruded pellets 70 covered by a sorbent outer shell 34 possess desirably high bacterial and fungal resistance as a result of each extruded pellet 70 having such a low water activity level.

Method of Forming Outer Shell

In a preferred method of forming each outer shell 34, relatively small particles 48 of smectite 38 each having a size less than one-tenth of the size of the lightweight core 36 to which the smectite 38 is applied in forming the outer shell 34 is used. In a preferred embodiment, the particles 48 of smectite 38, preferably are particles of bentonite, more preferably are particles of sodium bentonite, which are applied onto each lightweight core 36 to form each shell 34 in making each lightweight absorbent granule 32 have a maximum particle size no larger than 20 mesh (U.S.) with a preferred sorbent shell forming or coating material composed of particles having an average mesh size of at least 50 mesh (U.S.) such that the particles have an average size of 50 mesh (U.S.) or smaller (i.e., mesh size of 50 mesh and finer). In one preferred outer shell sorbent particle coating material formulation, a preferred smectite shell forming or coating material 38 composed of particles 48 having a mesh size smaller than 100 mesh (U.S.) and preferably between 100 mesh (U.S.) and 400 mesh (U.S.). In another preferred outer shell sorbent particle coating material formulation, a preferred sorbent shell forming or coating material 38 composed of particles 48 having a mesh size smaller than 150 mesh (U.S.) and preferably between 200 mesh (U.S.) and 300 mesh (U.S.).

Smectites that are preferably water-swellable or water swelling bentonite clays are well suited for use as outer shell sorbent forming or particle coating material 38 used to form the outer sorbent shell 34 of the lightweight sorbent granules 32 of the lightweight granular sorbent 30 of the present invention. Such water-swellable or water swelling bentonite clays useful in outer shell sorbent forming or particle coating material compositions for producing a desired sorbent outer shell 34 include any water-swellable bentonite clay that hydrate in the presence of water, e.g., swell in the presence of water. Suitable water-soluble bentonite clay can be selected from the group consisting of sodium bentonite, potassium bentonite, lithium bentonite, calcium bentonite and magnesium bentonite; or combination thereof, though sodium bentonite is preferred. The bentonite clay can be any member of the dioctahedral or trioctahedral smectite group, or a mixture thereof. Suitable bentonite clays for use as an outer shell sorbent forming or particle coating material include Montmorillonite, Beidellite, Nontronite, Hectorite and Saponite; or combinations thereof. Suitable bentonite clays for use as an outer shell sorbent forming or particle coating material can also include Attapulgite or Sepiolite alone or in combination with any of the aforementioned Montmorillonite, Beidellite, Nontronite, Hectorite and Saponite, including combinations thereof.

In order to achieve the full advantage of the present invention, regardless of the water-swellable bentonite that is used as sorbent shell material in making lightweight absorbent granules 32 of lightweight granular sorbent 30 of the present invention, it is preferred that the bentonite clay is not calcined. In other words, it is preferred that uncalcined bentonite clay be used and that any of the water-swellable bentonite clays suitable for use an outer shell sorbent forming or particle coating material in particulate form as described elsewhere herein be uncalcined, i.e., not be calcined. Calcination results in a loss of a portion of the hydroxyl groups from the bentonite clay, and such hydroxyl groups are related to the water-absorption and water-swelling properties of the bentonite clay. Consequently, a calcined bentonite clay, while still able to absorb many times its weight of a liquid, may not swell and agglomerate with nearby wetted and calcined bentonite particles as effectively as uncalcined bentonite particles.

In making lightweight sorbent granules 32 of lightweight granular sorbent 30 of the present invention, a coater that preferably is an agglomerator is used to coat extruded starch-containing pellets 70 with a particulate sorbent coating material 38 formed of powdered smectite, preferably bentonite, more preferably sodium bentonite, having a mesh or falling within an above-mentioned mesh range, using a plurality coating application cycles, preferably at least a plurality of pairs of coating material application cycles. While the cold water soluble material, particularly cold water soluble binder 50, formed in each pellet 70 from starches in the starch-containing admixture during pellet extrusion facilitates forming the outer shell 34 and clumping of finished lightweight sorbent granules 32, the presence of such a large amount of water solubles in each pellet 70 make it challenging to apply the particulate coating material 38 using a conventional wet coating or wet agglomerating method. This is because application of too much water will cause each pellet 70 being coated to undesirably shrink which not only densifies each pellet increasing its density, it also reduces the size of each pellet 70. In one preferred coater embodiment, a mixer that preferably is a horizontal or vertical ribbon blender is used in carrying out the above recited method of forming an outer shell 34 around each core 36 in making finished lightweight sorbent granules 32 of lightweight granular sorbent 30 of the present invention.

Densification due to pellet shrinkage makes it more difficult to coat the pellets 70 with sufficient particulate sorbent coating material 38 and produce finished lightweight sorbent granules 32 having a desired density that falls within a desired density range. When too much shrinkage occurs causing too much extruded pellet densification, forming the outer shell 34 by coating each extruded pellet 70 with particulate sorbent coating material 38 will typically produce finished lightweight sorbent granules 32 having a density that is too great such that the finished lightweight granular sorbent 30 will be too heavy. When this happens, the only way to produce lightweight sorbent granules 32 having a density falling within the desired density range typically is to undesirably apply a lesser amount of particulate sorbent coating material 38. Unfortunately, when less particulate sorbent coating material 38 is used to try to compensate for excessive pellet shrinkage and densification, the resultant lightweight sorbent granules 32 will typically be too small and expensive for the intended lightweight granular sorbent use.

A preferred method of making lightweight sorbent granules 32 in accordance with the present invention employs a method of coating extruded pellets 70 with particulate sorbent coating material 38 that advantageously minimizes pellet shrinkage during coating producing a finished lightweight sorbent granules 32 each having a size within ±15% of original pellet size when shell coating of each pellet 70 is completed. In one preferred method of coating extruded pellets 70 with particulate sorbent coating material 38 to make lightweight sorbent granules 32 of the present invention, a dry coating step is performed first before wetting any pellets 70 where dry particulate sorbent coating material 38 is applied onto dry pellets 70 before any wetting of the pellets 70 is performed advantageously minimizing pellet shrinkage and densification thereby producing finished lightweight sorbent granules 32 each having a size no greater than the original size of the pellet 70 forming the inner core 36 of the granule 32.

FIG. 8 illustrates a schematic diagram 80 depicting a preferred method of coating extruded pellets 70 to form an outer shell 34 around each pellet 70 that advantageously minimizes pellet shrinkage during outer shell formation during coating of the pellet 70 in a coater (not shown) that preferably is an agglomerator, such as a rotary drum agglomerator or the like, but which can be adapted for use with other types of coating, agglomerating, seasoning or other devices including mixers and/or blenders, such as horizontal and/or vertical ribbon blenders. With continued reference to FIG. 8, at a start 82 of the shell forming or coating method, a plurality of pairs, i.e., at least three, of extruded starch containing pellets 70 are substantially simultaneously introduced into the coater where a first dry coating step 84 is performed to first dry coat each one of the pellets 70 with particles 48, preferably dry powder, of dry particulate sorbent coating material 38 in an amount sufficient to at least partially cover each one of the pellets 70 with at least some particulate sorbent coating material 38.

By dry coating the pellets 70 in step 84 with dry particulate sorbent coating material 38 before wetting the pellets 70, any subsequent application of liquid, e.g., water, to wet the pellets 70 ensures at least some of the liquid wetting each pellet 70 will wet dry particulate sorbent coating material 38 and preferably be absorbed by the dry particulate sorbent coating material 38. Where the dry particulate sorbent coating material 38 is a powdered smectite that preferably is powdered bentonite, more preferably powdered sodium bentonite, having a mesh size no larger than 20 mesh (U.S.), preferably at least 150 mesh (U.S.) or finer, and more preferably between 100 mesh (U.S.) and 400 mesh (U.S.), the dry particulate smectite coating material 38 applied onto each pellet 70 during the dry coating step 84 absorbs at least some of any wetting liquid, e.g., water, applied during a wetting step 86 preventing the absorbed water from wetting the pellets 70 thereby advantageously reducing pellet shrinkage and densification.

When the dry particulate smectite coating material 38 applied during the dry coating step 84 is wetted, such as during wetting step 86, the particulate smectite coating material 38 gels and/or swells becoming sticky or tacky activating a smectite adhesion mechanism for adhesion of the particulate smectite coating material 38 to the outer surface 44 of the pellet 70 that does not require solubilizing water soluble binder 50, or at least does not require solubilizing as much water soluble binder 50, in order to bond particles 48 of the particulate smectite coating material 38 to each other and to the pellet 70. By reducing the amount of water soluble binder 50 in each pellet 70 being coated that is solubilized when wetting, e.g., wetting step 86, is performed, pellet shrinkage and densification is advantageously reduced while the available water soluble binder content of each pellet 70 being coated is maximized.

As a result, such a coating method in accordance with the present invention that utilizes a dry particulate smectite coating material application step 84 prior to any pellet wetting step being performed advantageously produces lightweight sorbent granules 32 of lightweight granular sorbent 30 of the present invention that more readily and more rapidly form clumps 54 of the wetted granules 32 that adhere together better producing clumps 54 having such higher clump retention rates and/or clump crush strengths. This is because each pellet 70 that forms the inner sorbent core 36 of each finished lightweight sorbent granule 32 of the invention has a greater amount of water-soluble binder remaining available for clumping when the outer shell 34 of the granule 32 is wetted, such as with water, urine, oil, solvents, liquid fecal matter, etc.

After the initial dry application of dry particulate smectite coating material 38 onto each one of the extruded starch-containing pellets 70 entering the coater in the dry coating step 84 and the subsequent first wetting step 86 are performed, at least one additional cycle of a dry particulate smectite coating material application step 88 and wetting step 90 is performed before coating of the pellets 70 to form the outer sorbent shell 34 may potentially be considered to be complete. Preferably, however, at least one additional dry particulate smectite coating material application step 92 is performed before a determination at step 94 is performed to determine whether a sufficient amount of the particulate smectite coating material 38 has been bonded to each pellet 70, as well as to each other, such that a finished lightweight sorbent granule 32 in accordance with the present invention has been formed.

Where additional particulate smectite coating material 38 needs to be applied to the pellets 70, at least one additional cycle of a wetting step, e.g., wetting step 90 and one additional particulate smectite coating material application step, e.g. coating step 92, is performed before a another check 94 is made to determine whether a sufficient amount of the particulate smectite coating material 38 has been applied to form a suitable outer shell 34. When it has been determined at 94 that the outer shell 34 has been adequately formed around each pellet 70 such that formation of the outer shell is complete at step 96 thereby producing finished lightweight sorbent granules 32 having a desired size of no greater than 3.5 mm in length, width and/or diameter and which have a desired density falling between 20 pounds per cubic feet and 40 pounds per cubic feet, the finished lightweight sorbent granules 32 are preferably discharged at step 98 from the coater.

During at least one and preferably a plurality of the wetting steps 86 and/or 90, wetting liquid, preferably water, is discharged through an atomizing spray head or mister while turbulently flowing gas that preferably is air is directed towards the at least partially coated pellets 70 being wetted with the wetting liquid. In a preferred coating method and embodiment, turbulently flowing gas, e.g., air, is discharged from at least one and preferably a plurality of discharge nozzles towards the at least partially coated pellets 70 being wetted to facilitate further coating by turbulently mixing the particulate smectite coating material 38, e.g., find mesh smectite powder, inside the coater in a manner that helps direct more of the wetting liquid onto the coating material 38 then onto the at least partially coated pellets 70. This helps ensure the primary mechanism for bonding particles 48 of particulate smectite coating material 38 to each other and each pellet 70 is via smectite adhesion thereby minimizing the amount of water solubles, including water-soluble binder 50, which is solubilized in each pellet 70 during coating.

In a preferred lightweight granular sorbent embodiment made using such a method of coating lightweight cores 36 in accordance with that discussed above are preferably each formed of extruded starch-containing pellets 70, each outer shell 34 of each lightweight sorbent granule 32 is made of such a fine mesh or powdered smectite or swelling clay, preferably bentonite clay, more preferably sodium bentonite, having a bulk density of approximately 60 lbs/ft$^3$ with each extruded pellet 70 having a bulk density no greater than 20 lbs/ft$^3$. Such a lightweight granular sorbent 30 preferably has sorbent granules 32 each formed of (a) no less than 60% swelling clay, preferably bentonite clay, more preferably sodium bentonite, and (b) no more than 60% of such extruded pellet(s) 70 having such a relatively low bulk density no greater than 20 lbs/ft$^3$ (i.e., no greater than one-fourth the bulk density of the outer shell material) by lightweight sorbent granule weight. One such preferred granular sorbent embodiment has lightweight sorbent granules 32 made of between 80% and 60% swelling clay, preferably bentonite clay, more preferably sodium bentonite, and between 20% and 40% of such extruded pellets 70 having such a relatively low bulk density no greater than 20 lbs/ft$^3$ (i.e., no greater than one-fourth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 20 lbs/ft$^3$ and 45 lbs/ft$^3$, preferably between 25 lbs/ft$^3$ and 40 lbs/ft$^3$, more preferably between 27 lbs/ft$^3$ and 32 lbs/ft$^3$, and which preferably is not less than 60% of the bulk density of conventional granular sorbent made of conventional sorbent granules formed substantially completely of such smectite, i.e., granules formed of solid smectite.

In another preferred lightweight granular sorbent embodiment made using such a method of coating lightweight cores 36 in accordance with that discussed above are preferably each formed of extruded starch-containing pellets 70, each outer shell 34 of each lightweight sorbent granule 32 is made of such a fine mesh or powdered smectite or swelling clay, preferably bentonite clay, more preferably sodium bentonite, having a bulk density of approximately 60 lbs/ft$^3$ with each extruded pellet 70 having a bulk density no greater than 15 lbs/ft$^3$. Such a lightweight granular sorbent 30 preferably has sorbent granules 32 each formed of (a) no less than 60% swelling clay, preferably bentonite clay, more preferably sodium bentonite, and (b) no more than 60% of such extruded pellet(s) 70 having such a relatively low bulk density no greater than 15 lbs/ft$^3$ (i.e., no greater than one-fourth the bulk density of the outer shell material) by lightweight sorbent granule weight. One such preferred granular sorbent embodiment has lightweight sorbent granules 32 made of between 80% and 60% swelling clay, preferably bentonite clay, more preferably sodium bentonite, and between 20% and 40% of such extruded pellets 70 having such a relatively low bulk density no greater than 15 lbs/ft$^3$ (i.e., no greater than one-fourth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 20 lbs/ft$^3$ and 45 lbs/ft$^3$, preferably between 25 lbs/ft$^3$ and 40 lbs/ft$^3$, more preferably between 27 lbs/ft$^3$ and 32 lbs/ft$^3$, and which preferably is not less than 60% of the bulk density of conventional granular sorbent made of conventional sorbent granules formed substantially completely of such smectite, i.e., granules formed of solid smectite.

In still another preferred lightweight granular sorbent embodiment made using a method of coating lightweight cores 36 that are preferably each formed of extruded starch-containing pellets 70 in accordance with the present invention, each outer shell 34 of each lightweight sorbent granule 32 is made of a smectite or swelling clay, preferably bentonite clay, more preferably sodium bentonite, having a bulk density of approximately 60 lbs/ft$^3$ and each extruded pellet 70 has a bulk density no greater than 12 lbs/ft$^3$. Such a lightweight granular sorbent 30 preferably has sorbent granules 32 each formed of (a) no more than 70% swelling clay, preferably bentonite clay, more preferably sodium bentonite, (forming outer shell 34), and (b) no more than 40% of such extruded pellet(s) 70 having such a relatively low bulk density no greater than 12 lbs/ft$^3$ (i.e., no greater than one-fifth the bulk density of the outer shell material) by lightweight sorbent granule weight. One such preferred granular sorbent embodiment has lightweight sorbent granules 32 made of between 70% and 60% swelling clay, preferably bentonite clay, more preferably sodium bentonite, and between 30% and 40% of such extruded pellets 70 having such a relatively low bulk density no greater than 12 lbs/ft$^3$ (i.e., no greater than one-fourth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 20 lbs/ft$^3$ and 40 lbs/ft$^3$, preferably between 25 lbs/ft$^3$ and 35 lbs/ft$^3$, and which preferably is no greater than 50% of the bulk density of conventional granular sorbent made of sorbent granules formed substantially completely of such smectite.

In a further preferred lightweight granular sorbent embodiment made using such a coating method in accordance with the present invention, each outer shell 34 is made of a swelling clay, preferably bentonite clay, more preferably sodium bentonite, having a bulk density of about 60 lbs/ft$^3$ and each lightweight core 36 is formed of an extruded pellet

70 having a bulk density no greater than 10 lbs/ft$^3$. Such a lightweight granular sorbent 30 preferably has sorbent granules 32 each formed of (a) no more than 90% swelling clay, preferably bentonite clay, more preferably sodium bentonite, (e.g., forming outer shell 34), and (b) no more than 30% of such extruded pellet(s) 70 having such a relatively low bulk density no greater than 10 lbs/ft$^3$ (i.e., no greater than one-sixth the bulk density of the outer shell material) by lightweight sorbent granule weight. One such preferred granular sorbent embodiment has lightweight sorbent granules 32 made of between 90% and 70% swelling clay, preferably bentonite clay, more preferably sodium bentonite, and between 10% and 30% of such extruded pellet(s) 70 having such a relatively low bulk density no greater than 10 lbs/ft$^3$ (i.e., no greater than one-sixth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 25 lbs/ft$^3$ and 35 lbs/ft$^3$, preferably between 27 lbs/ft$^3$ and 32 lbs/ft$^3$, and which preferably is no greater than 60% of the bulk density of conventional granular sorbent made of sorbent granules formed substantially completely of such smectite.

In still another preferred lightweight granular sorbent embodiment made using such a coating method in accordance with the present invention, each outer shell 34 is made of a swelling clay, preferably bentonite clay, more preferably sodium bentonite, having a bulk density of about 60 lbs/ft$^3$ and each lightweight core 36 is an extruded pellet 70 having a bulk density no greater than 6 lbs/ft$^3$. Such a lightweight granular sorbent 30 preferably has sorbent granules 32 each formed of (a) no more than 90% swelling clay, preferably bentonite clay, more preferably sodium bentonite, (e.g., forming outer shell 34), and (b) no more than 30% of such extruded pellet(s) 70 having such a relatively low bulk density no greater than 6 lbs/ft$^3$ (i.e., no greater than one-tenth the bulk density of the outer shell material) by lightweight sorbent granule weight. One such preferred granular sorbent embodiment has lightweight sorbent granules 32 made of between 90% and 70% swelling clay, preferably bentonite clay, more preferably sodium bentonite, and between 10% and 30% of such an extruded pellet 70 having such a relatively low bulk density no greater than 6 lbs/ft$^3$ (i.e., no greater than one-sixth the bulk density of the outer shell material) by lightweight sorbent granule weight. Such a lightweight granular sorbent 30 formed of at least a plurality of pairs, i.e., at least three, of such lightweight sorbent granules 32 has a bulk density of between 25 lbs/ft$^3$ and 35 lbs/ft$^3$, preferably between 27 lbs/ft$^3$ and 32 lbs/ft$^3$, and which preferably is no greater than 60% of the bulk density of conventional granular sorbent made of sorbent granules formed substantially completely of such smectite.

The present invention is directed to a granular sorbent formed of a plurality of sorbent granules, each sorbent granule having (a) an inner core that formed of a first sorbent material, the inner core having a first density; and (b) an outer shell formed of a second sorbent material, the outer shell having a second density greater than the first density of the inner core, and the outer shell extending substantially completely about the inner core. An outer shell of each sorbent granule preferably is formed by particles of the first sorbent material in a water soluble binder matrix that adhesively attaches the particles of the first sorbent material to the inner core. Water soluble binder adhesively attaching the particles of the first sorbent material to the inner core preferably is or includes cold water soluble amylopectin binder. The inner core preferably is formed of an extruded pellet having cold water soluble amylopectin binder that provides the water soluble binder adhesively attaching the particles of the first sorbent material to the inner core forming the sorbent outer shell.

The outer shell of each sorbent granule preferably includes water soluble binder and particles of the first sorbent material in a water soluble binder matrix formed of the water soluble binder that releases water soluble binder when the sorbent granule is wetted facilitating clumping of a plurality of pairs of wetted sorbent granules together forming a clump comprised of at least a plurality of pairs of the sorbent granules. The clump formed of the plurality of pairs of the sorbent granules preferably has a clump retention rate of at least 93%. The clump formed of the plurality of pairs of the sorbent granules preferably has a clump crush strength of at least 15 pounds per square inch. The clump formed of the plurality of pairs of the sorbent granules preferably has a clump crush strength of at least 15 pounds per square inch. The water soluble binder adhesively attaching the particles of the first sorbent material in the water soluble binder matrix comprising the outer shell preferably are adhesively attached by water soluble binder to the inner core. The water soluble binder adhesively attaching the particles of the first sorbent material of the shell to the inner core preferably is or includes cold water soluble amylopectin binder. The inner core preferably includes cold water soluble amylopectin binder, and the water soluble binder forming the water soluble matrix of the outer shell preferably includes cold water soluble amylopectin binder from the inner core. The core preferably has a plurality of inner liquid absorbing pockets. The core preferably is comprised of an extruded pellet. The extruded pellet preferably is comprised of starch. The core preferably has a porous outer surface having a plurality of pores formed therein. The core preferably is comprised of an extruded pellet. The extruded pellet preferably is comprised of starch. The water soluble binder adhesively attaching the particles of the first sorbent material of the shell to the inner core preferably is comprised of cold water soluble amylopectin binder and the clump formed of the plurality of pairs of the sorbent granules preferably has a clump retention rate of at least 93%. The clump formed of the plurality of pairs of the sorbent granules preferably has a clump crush strength of at least 15 pounds per square inch. The clump formed of the plurality of pairs of the sorbent granules preferably has a clump retention rate of at least 95%. The clump formed of the plurality of pairs of the sorbent granules preferably has a clump crush strength of at least 20 pounds per square inch. The clump formed of the plurality of pairs of the sorbent granules preferably has a clump retention rate of at least 97%. The clump formed of the plurality of pairs of the sorbent granules preferably has a clump crush strength of at least 25 pounds per square inch.

The outer shell of each sorbent granule preferably includes water soluble binder and particles of the first sorbent material in a water soluble binder matrix formed of the water soluble binder that solubilizes water soluble binder therefrom when the sorbent granule is wetted making an outer surface of the sorbent granule tacky facilitating clumping of a plurality of pairs of wetted sorbent granules together forming a clump having at least a plurality of pairs of the sorbent granules. The clump formed of the plurality of pairs of the sorbent granules preferably has a clump retention rate of at least 93%. The clump formed of the plurality of pairs of the sorbent granules preferably has a clump crush strength of at least 15 pounds per square inch. The clump formed of the plurality of pairs of the sorbent granules has a clump crush strength of at least 15 pounds per square inch. The water soluble binder of the water soluble binder matrix of the shell preferably adhesively attaches the outer shell to the core. The water soluble binder of the outer shell preferably is or includes cold water soluble amylopectin binder. The inner core preferably is or includes cold water soluble amylopectin binder, and the water soluble binder forming the water soluble matrix of the outer shell preferably is or includes cold water soluble amylopectin binder from the inner core. The clump formed of the plurality of pairs of the sorbent granules preferably has a clump retention rate of at least 93%. The inner core preferably is or includes an extruded pellet comprised of starch. The clump formed of the plurality of pairs of the sorbent granules preferably has a clump crush strength of at least 15 pounds per square inch. The clump formed of the plurality of pairs of the sorbent granules preferably has a clump crush strength of at least 15 pounds per square inch. The inner core preferably is or includes an extruded pellet comprised of starch. The water soluble binder preferably is or includes cold water soluble amylopectin binder.

The outer shell of each sorbent granule preferably includes water soluble binder and particles of the first sorbent material in a water soluble binder matrix formed of the water soluble binder, wherein the inner shell preferably is comprised of water soluble binder, and wherein water soluble binder of one of the outer shell and inner core solubilizes when the sorbent granule is wetted making an outer surface of the sorbent granule tacky facilitating clumping of a plurality of pairs of wetted sorbent granules together forming a clump comprised of at least a plurality of pairs of the sorbent granules. The water soluble binder preferably is or includes cold water soluble amylopectin binder. The water soluble binder of the water soluble binder matrix of the outer shell preferably is formed of water soluble binder provided by the inner core. The water soluble binder preferably is or includes cold water soluble amylopectin binder. The water soluble binder of the water soluble binder matrix of the outer shell preferably adhesively attaches the outer shell to the inner core. The water soluble binder of the water soluble binder matrix of the outer shell preferably adhesively attaches the outer shell to the inner core. The clump formed of the plurality of pairs of the sorbent granules preferably has a clump retention rate of at least 93%. The clump formed of the plurality of pairs of the sorbent granules preferably has a clump crush strength of at least 15 pounds per square inch. The clump formed of the plurality of pairs of the sorbent granules preferably has a clump crush strength of at least 15 pounds per square inch. The clump formed of the plurality of pairs of the sorbent granules preferably has a clump retention rate of at least 95%. The clump formed of the plurality of pairs of the sorbent granules preferably has a clump crush strength of at least 20 pounds per square inch. The clump formed of the plurality of pairs of the sorbent granules preferably has a clump crush strength of at least 20 pounds per square inch. The clump formed of the plurality of pairs of the sorbent granules preferably has a clump retention rate of at least 97%. The clump formed of the plurality of pairs of the sorbent granules preferably has a clump crush strength of at least 25 pounds per square inch. The clump formed of the plurality of pairs of the sorbent granules preferably has a clump crush strength of at least 25 pounds per square inch.

The outer shell of each sorbent granule preferably includes water soluble binder and particles of the first sorbent material in a water soluble binder matrix formed of the water soluble binder that solubilizes water soluble binder of the outer shell when the sorbent granule is wetted producing a flowable adhesive that flows from the wetted sorbent granule around and between a plurality of adjacent wetted sorbent granules clumping a plurality of pairs of the sorbent granules together forming a clump comprised of the plurality of pairs of the sorbent granules. The clump formed of the plurality of pairs of the sorbent granules preferably has a clump retention rate of at least 93%. The water soluble binder preferably is or includes cold water soluble amylopectin binder. The water soluble binder preferably adhesively attaches the particles of the first sorbent material of the shell to the inner core. The clump formed of the plurality of pairs of the sorbent granules preferably has a clump crush strength of at least 15 pounds per square inch. The water soluble binder preferably is or includes cold water soluble amylopectin binder. The water soluble binder preferably adhesively attaches the particles of the first sorbent material of the shell to the inner core. The water soluble binder preferably is or includes cold water soluble amylopectin binder. The clump formed of the plurality of pairs of the sorbent granules preferably has a clump retention rate of at least 95%. The clump formed of the plurality of pairs of the sorbent granules preferably has a clump crush strength of at least 20 pounds per square inch. The clump formed of the plurality of pairs of the sorbent granules preferably has a clump retention rate of at least 97%. The clump formed of the plurality of pairs of the sorbent granules preferably has a clump crush strength of at least 25 pounds per square inch. The inner core of each sorbent granule preferably has a porous outer surface and an interior having a plurality of pockets. The inner core of each sorbent granule preferably is or includes an extruded starch-containing pellet.

An outer shell of each lightweight absorbent granule of lightweight granular sorbent of the present invention advantageously is foamed, void filled or air pocket filled as a result of particles, e.g., powder, of absorbent, preferably smectite, more preferably sodium bentonite, during application around the lightweight core or extruded pellet reducing the density of the outer shell to a bulk density less than that of the smectite, preferably sodium bentonite. Selective intermittent application of liquid, preferably water, using an atomized sprayer or misting nozzle directed by turbulently flowing air from nozzles foam the shell as the particles, e.g., powder, of smectite, preferably sodium bentonite, is being applied by bonding to each inner core or extruded pellet forming the inner core. As a result, the outer shell formed of particles of shell sorbent material, preferably smectite, more preferably sodium bentonite, bonded together and to the inner core by water soluble binder that provides the water soluble binder matrix of the outer shell forms an outer shell having a density that is less than the density of the shell sorbent material alone. In one such preferred embodiment, the outer shell has a density less than the density of the shell sorbent material. Where the shell sorbent material is a smectite, the resultant outer shell formed around the inner core, e.g., extruded pellet, has a density, preferably bulk density, which is less than the density, preferably bulk density, of the smectite used in making the shell. Where the shell sorbent material is a bentonite, the resultant outer shell formed around the inner core, e.g., extruded pellet, has a density, preferably bulk density, which is less than the density, preferably bulk density, of the bentonite used in making the shell. Where the shell sorbent material is sodium bentonite, the resultant outer shell formed around the inner core, e.g., extruded pellet, has a density, preferably bulk density, which is less than the density, preferably bulk density, of the sodium bentonite used in making the shell.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A coated granular sorbent formed of a plurality of sorbent granules that clump when wetted with water, each sorbent granule having a water absorbency of at least 4 times sorbent granule weight and comprising:
   (a) an extruded sorbent pellet comprised of starch that is extruded from a starch-containing admixture, the extruded sorbent pellet having:
      (i) a water absorbency of at least 3.5 times extruded sorbent pellet weight,
      (ii) at least 10% of a cold water-soluble binder by extruded sorbent pellet weight, the cold water-soluble binder formed of starch in the starch-containing admixture modified during extrusion of the extruded sorbent pellet,
      (iii) an outer surface comprised of the cold water-soluble binder; and
   (b) a water soluble outer sorbent shell covering the outer surface of the extruded sorbent pellet and defining an outer surface of the sorbent granule, the outer sorbent shell comprised of:
      (i) a smectite having a bulk density greater than a bulk density of the extruded sorbent pellet, and
      (ii) the cold water-soluble binder from the extruded sorbent pellet adhering the smectite to the outer surface of the extruded sorbent pellet, and
   wherein the cold water-soluble binder in the sorbent granule from the extruded sorbent pellet solubilizes when the sorbent granule is wetted with water making an outer surface of the wetted sorbent granule tacky facilitating clumping of a plurality of pairs of the sorbent granules wetted with water together forming a scoopable clump comprised of the plurality of pairs of the wetted sorbent granules.

2. The coated granular sorbent of claim 1 wherein the smectite of the outer sorbent shell is composed of particles of a bentonite, and wherein the cold water-soluble binder from the extruded sorbent pellet adhesively attaches the particles of the bentonite to the outer surface of the extruded sorbent pellet and to other of the particles of the bentonite.

3. The coated granular sorbent of claim 2 wherein the cold water-soluble binder adhesively attaching the particles of the bentonite to the outer surface of the extruded sorbent pellet is a cold water-soluble amylopectin binder formed of starch in the starch-containing mixture physically modified during extrusion of the extruded sorbent pellet.

4. The coated granular sorbent of claim 1 wherein the smectite is composed of particles of sodium bentonite, wherein the outer shell is comprised of a cold water-soluble binder matrix formed of the cold water-soluble binder from the extruded sorbent pellet adhering the particles of the sodium bentonite to the outer surface of the extruded sorbent pellet and to other of the particles of the sodium bentonite, and wherein the cold water-soluble binder in the cold water-soluble matrix solubilizes when the sorbent granule is wetted with water making the wetted sorbent granule tacky thereby facilitating clumping of the wetted sorbent granule with the plurality of pairs of the wetted sorbent granules.

5. The coated granular sorbent of claim 1 wherein the outer sorbent shell has a bulk density less than the bulk density of the smectite.

6. The coated granular sorbent of claim 1 wherein a scoopable clump formed of the plurality of pairs of the sorbent granules has a clump retention rate of at least 95% and a clump crush strength of at least 40 pounds per square inch when dried to a moisture content of no greater than 12%.

7. The coated granular sorbent of claim 1 wherein the starch-containing admixture from which the extruded sorbent pellet is extruded is comprised of a sorghum.

8. The coated granular sorbent of claim 1 wherein the starch-containing admixture from which the extruded sorbent pellet is extruded is comprised of a wheat.

9. The coated granular sorbent of claim 1 wherein the starch-containing admixture from which the extruded sorbent pellet is extruded is comprised of a corn or a cornmeal.

10. The coated granular sorbent of claim 1 wherein the extruded sorbent pellet has a plurality of internal voids or pockets disposed inside the extruded sorbent pellet.

11. The coated granular sorbent of claim 1 wherein the smectite of the outer sorbent shell is comprised of a calcium bentonite.

12. The coated granular sorbent of claim 1 wherein the cold water-soluble binder is formed of starch in the extruded sorbent pellet physically modified into the cold water-soluble binder during extrusion of the extruded sorbent pellet.

13. The coated granular sorbent of claim 1 wherein the outer surface of the extruded sorbent pellet is comprised of a plurality of pores formed therein.

14. The coated granular sorbent of claim 1 wherein the extruded sorbent pellet is extruded from a cereal grain.

15. The coated granular sorbent of claim 1 wherein the smectite of the outer sorbent shell is comprised of bentonite, and wherein each sorbent granule is of a two-stage clumping mechanism construction when wetted with urine or water by (i) the bentonite of the outer sorbent shell wetted with water facilitating clumping, and (ii) the water-soluble binder of the outer sorbent shell solubilized from being wetted with water facilitating clumping.

16. The coated granular sorbent of claim 1 wherein the extruded sorbent pellet has a cold water solubles content of at least 20% by extruded sorbent pellet weight.

17. The coated granular sorbent of claim 1 wherein the bulk density of the extruded sorbent pellet is no greater than one-fourth of the bulk density of the smectite of the outer sorbent shell.

18. The coated granular sorbent of claim 1 wherein the smectite of the outer sorbent shell is comprised of a sodium bentonite powder.

19. The coated granular sorbent of claim 1 wherein the smectite of the outer sorbent shell is comprised of at least one of Montmorillonite, Beidellite, Nontronite, Hectorite, Saponite, Attapulgite and Sepiolite.

20. The coated granular sorbent of claim 1 wherein each sorbent granule has a size no greater than a size of the extruded sorbent pellet prior to adherence of the smectite by the cold water-soluble binder from the extruded sorbent pellet to the outer surface of the extruded sorbent pellet.

21. The coated granular sorbent of claim 1 wherein the clump comprised of the plurality of pairs of the wetted sorbent granules shrinks at least 8% when the clump is dried to a moisture content of no more than 12%.

22. The coated granular sorbent of claim 1 wherein the starch-containing admixture from which the extruded sorbent pellet is extruded (i) contains no separate binder additive added specifically to facilitate clumping, and (ii) contains no smectite.

23. The coated granular sorbent of claim 1 wherein the smectite of the outer sorbent shell is comprised of a powdered smectite.

24. The coated granular sorbent of claim 1 wherein the sorbent granule has a water absorbency of at least three and one-half times a weight of the sorbent granule.

\* \* \* \* \*